(12) United States Patent
Kakutani

(10) Patent No.: US 8,491,078 B2
(45) Date of Patent: Jul. 23, 2013

(54) PRINTING APPARATUS AND PRINTING METHOD

(75) Inventor: Toshiaki Kakutani, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 667 days.

(21) Appl. No.: 12/616,684

(22) Filed: Nov. 11, 2009

(65) Prior Publication Data
US 2010/0118077 A1 May 13, 2010

(30) Foreign Application Priority Data

Nov. 12, 2008 (JP) ................................. 2008-289676
Jan. 30, 2009 (JP) ................................. 2009-019237

(51) Int. Cl.
*B41J 29/38* (2006.01)

(52) U.S. Cl.
USPC ......................................... 347/12; 400/240.2

(58) Field of Classification Search
USPC ......................................... 400/240.2; 347/12
See application file for complete search history.

(56) References Cited

U.S. PATENT DOCUMENTS

| | | | | |
|---|---|---|---|---|
| 5,144,331 A | * | 9/1992 | Amano | 347/178 |
| 5,422,666 A | * | 6/1995 | Koyama | 347/41 |
| 6,033,137 A | * | 3/2000 | Ito | 400/74 |
| 6,719,402 B2 | | 4/2004 | Nakagawa et al. | |
| 7,422,300 B2 | * | 9/2008 | Yamanobe | 347/14 |
| 2005/0128234 A1 | * | 6/2005 | Yokozawa | 347/12 |
| 2007/0247649 A1 | * | 10/2007 | Kanematsu et al. | 358/1.9 |

FOREIGN PATENT DOCUMENTS

| | | | |
|---|---|---|---|
| JP | 06166182 A | * | 6/1994 |
| JP | 6-226999 | * | 8/1994 |
| JP | 2002-166536 A | | 6/2002 |
| JP | 2007-145031 A | | 6/2007 |
| JP | 2008-126616 A | | 6/2008 |
| JP | 2008-130003 A | | 6/2008 |

* cited by examiner

*Primary Examiner* — Charlie Peng
(74) *Attorney, Agent, or Firm* — Kilpatrick Townsend & Stockton LLP

(57) ABSTRACT

A printing apparatus performs printing on a printing medium by moving a print head relative to the printing medium in a main scanning direction, which is a width direction of the printing medium, and a sub-scanning direction that intersects the main scanning direction. The printing apparatus includes a print head that includes a plurality of nozzles configured to eject ink; an acquisition unit that acquires image data; and a dot forming unit that controls the print head so as to eject the ink to form dots corresponding to the image data on the printing medium. When suppression dots, which are dots formed to suppress bleeding, are formed on the printing medium, the dot forming unit controls the print head so that ink corresponding to the suppression dots is ejected from preceding nozzles arranged to eject ink to the printing medium earlier than other nozzles of the plurality of nozzles.

20 Claims, 31 Drawing Sheets

FIRST EMBODIMENT

SECOND DITHER MASK D2

FIG. 9

DOT FORMING POSITION WHEN DOT RECORDING RATE IS 5%

FIG. 10

DOT FORMING POSITION WHEN DOT RECORDING RATE IS 30%

DOT RECORDING RATE TABLE DT

SECOND EMBODIMENT

FIG. 15

FIRST DITHER MASK D1b

DOT FORMING POSITION WHEN DOT RECORDING RATE IS 60%

THIRD EMBODIMENT

FIG. 18

FIRST DITHER MASK D1c

| 122 | 130 | 24 | 182 | 112 | 76 | 60 | 114 | 83 | 219 | 26 | 102 | 88 | 148 | 21 | 229 |
|---|---|---|---|---|---|---|---|---|---|---|---|---|---|---|---|
| 28 | 197 | 63 | 17 | 244 | 219 | 7 | 78 | 125 | 180 | 52 | 219 | 233 | 147 | 78 | 31 |
| 8 | 226 | 97 | 34 | 52 | 217 | 33 | 157 | 119 | 22 | 48 | 170 | 68 | 55 | 107 | 112 |
| 168 | 137 | 109 | 174 | 97 | 194 | 32 | 248 | 91 | 163 | 179 | 113 | 7 | 244 | 101 | 201 |
| 45 | 61 | 243 | 185 | 11 | 102 | 110 | 197 | 2 | 86 | 104 | 249 | 15 | 194 | 33 | 27 |
| 20 | 162 | 58 | 220 | 205 | 147 | 82 | 135 | 214 | 209 | 41 | 197 | 80 | 178 | 205 | 160 |
| 113 | 181 | 78 | 2 | 62 | 243 | 89 | 45 | 74 | 142 | 48 | 160 | 126 | 86 | 96 | 209 |
| 120 | 248 | 164 | 130 | 46 | 230 | 142 | 163 | 14 | 255 | 183 | 154 | 134 | 77 | 27 | 253 |
| 39 | 227 | 25 | 156 | 150 | 136 | 7 | 174 | 106 | 237 | 24 | 10 | 85 | 243 | 57 | 143 |
| 77 | 173 | 16 | 211 | 251 | 195 | 67 | 181 | 177 | 132 | 81 | 229 | 40 | 214 | 201 | 190 |
| 119 | 116 | 81 | 219 | 50 | 79 | 120 | 227 | 40 | 91 | 157 | 192 | 68 | 161 | 33 | 32 |
| 180 | 241 | 103 | 153 | 148 | 111 | 33 | 250 | 112 | 203 | 130 | 167 | 232 | 138 | 74 | 241 |
| 104 | 24 | 18 | 201 | 209 | 173 | 61 | 33 | 105 | 153 | 2 | 214 | 246 | 115 | 100 | 227 |
| 60 | 200 | 245 | 229 | 71 | 183 | 191 | 217 | 241 | 149 | 68 | 192 | 12 | 222 | 170 | 182 |
| 175 | 155 | 62 | 93 | 103 | 238 | 34 | 147 | 88 | 235 | 167 | 77 | 59 | 185 | 34 | 150 |
| 145 | 10 | 213 | 64 | 1 | 16 | 154 | 103 | 29 | 38 | 161 | 100 | 223 | 10 | 124 | 109 |
| 28 | 216 | 48 | 200 | 130 | 168 | 236 | 135 | 7 | 205 | 79 | 174 | 125 | 249 | 95 | 61 |
| 9 | 84 | 136 | 173 | 89 | 45 | 223 | 73 | 121 | 121 | 95 | 30 | 50 | 87 | 83 | 55 |
| 138 | 136 | 203 | 88 | 11 | 221 | 89 | 64 | 120 | 252 | 24 | 10 | 211 | 162 | 7 | 219 |
| 113 | 57 | 236 | 28 | 162 | 94 | 70 | 23 | 199 | 53 | 214 | 81 | 177 | 37 | 237 | 111 |
| 56 | 225 | 106 | 159 | 78 | 248 | 193 | 200 | 56 | 137 | 203 | 188 | 71 | 214 | 96 | 136 |
| 189 | 88 | 32 | 117 | 205 | 3 | 141 | 127 | 16 | 100 | 154 | 10 | 49 | 224 | 141 | 18 |
| 210 | 17 | 32 | 186 | 145 | 151 | 26 | 167 | 117 | 179 | 172 | 246 | 48 | 156 | 181 | 238 |
| 144 | 48 | 248 | 67 | 64 | 188 | 179 | 78 | 254 | 32 | 121 | 64 | 222 | 82 | 12 | 93 |
| 108 | 200 | 178 | 233 | 53 | 216 | 75 | 128 | 216 | 226 | 1 | 133 | 150 | 212 | 40 | 175 |
| 200 | 188 | 89 | 9 | 141 | 98 | 213 | 22 | 106 | 76 | 189 | 195 | 142 | 45 | 242 | 9 |
| 7 | 169 | 129 | 139 | 249 | 188 | 99 | 248 | 140 | 148 | 72 | 199 | 210 | 155 | 112 | 228 |
| 224 | 65 | 168 | 127 | 234 | 45 | 8 | 160 | 162 | 114 | 220 | 12 | 75 | 121 | 185 | 86 |
| 187 | 250 | 75 | 216 | 22 | 153 | 186 | 210 | 25 | 174 | 239 | 192 | 101 | 254 | 29 | 130 |
| 54 | 31 | 130 | 110 | 186 | 87 | 153 | 28 | 239 | 49 | 23 | 114 | 232 | 45 | 163 | 204 |
| 152 | 0 | 240 | 56 | 95 | 126 | 221 | 41 | 117 | 99 | 148 | 18 | 56 | 84 | 162 | 39 |
| 241 | 81 | 209 | 171 | 78 | 7 | 211 | 107 | 133 | 234 | 197 | 83 | 148 | 167 | 60 | 7 |
| 78 | 105 | 21 | 39 | 153 | 82 | 59 | 9 | 212 | 72 | 3 | 117 | 248 | 56 | 138 | 112 |
| 150 | 127 | 181 | 44 | 244 | 209 | 176 | 75 | 218 | 28 | 84 | 68 | 222 | 33 | 192 | 146 |
| 176 | 19 | 226 | 102 | 130 | 22 | 182 | 188 | 94 | 62 | 174 | 38 | 192 | 7 | 96 | 92 |
| 230 | 73 | 46 | 115 | 158 | 3 | 140 | 151 | 164 | 193 | 245 | 111 | 179 | 206 | 128 | 104 |
| 144 | 201 | 57 | 67 | 254 | 120 | 38 | 71 | 237 | 27 | 27 | 106 | 76 | 253 | 138 | 35 |
| 156 | 50 | 213 | 188 | 202 | 76 | 224 | 111 | 42 | 52 | 206 | 91 | 159 | 4 | 211 | 173 |
| 207 | 57 | 173 | 15 | 111 | 39 | 196 | 89 | 125 | 127 | 174 | 20 | 212 | 83 | 238 | 59 |
| 193 | 16 | 244 | 113 | 142 | 238 | 173 | 31 | 252 | 156 | 190 | 244 | 112 | 78 | 238 | 45 |
| 134 | 75 | 225 | 115 | 10 | 176 | 157 | 12 | 220 | 65 | 99 | 122 | 70 | 44 | 164 | 113 |
| 139 | 251 | 160 | 96 | 198 | 50 | 218 | 218 | 150 | 1 | 169 | 106 | 211 | 206 | 174 | 151 |
| 182 | 107 | 74 | 9 | 218 | 51 | 193 | 98 | 130 | 121 | 242 | 15 | 185 | 225 | 19 | 39 |
| 231 | 64 | 186 | 175 | 250 | 131 | 144 | 95 | 191 | 139 | 240 | 179 | 152 | 78 | 236 | 37 |
| 152 | 55 | 241 | 176 | 146 | 73 | 36 | 206 | 217 | 45 | 77 | 72 | 153 | 88 | 216 | 110 |
| 11 | 159 | 82 | 28 | 30 | 213 | 94 | 46 | 4 | 242 | 69 | 16 | 89 | 249 | | |
| 213 | 97 | 128 | 1 | 186 | 121 | 255 | 38 | 190 | 117 | 143 | 171 | 233 | 24 | | |
| 48 | 128 | 164 | 203 | 65 | 81 | 46 | 143 | 110 | 105 | 25 | 170 | 47 | 72 | | |
| 87 | 170 | 235 | 33 | 163 | 112 | 95 | 222 | 171 | 20 | 217 | | | | | |
| 82 | 182 | 37 | 11 | 103 | 221 | 9 | 180 | 76 | 4 | 195 | | | | | |
| 185 | 65 | 141 | 230 | 210 | | | | | | | | | | | |
| 105 | 246 | 19 | 149 | 74 | | | | | | | | | | | |

DOT FORMING POSITION WHEN DOT RECORDING RATE IS 50%

FIG. 20

DOT FORMING POSITION ASSOCIATED WITH NOZZLE NUMBERS 0 TO 6

| 122 | 130 | 24 | 182 | 112 | 76 | 60 | 114 | 83 | 219 | 26 | 102 | 88 | 148 | 21 | 229 |
|---|---|---|---|---|---|---|---|---|---|---|---|---|---|---|---|
| 28 | 197 | 63 | 17 | 244 | 219 | 7 | 78 | 125 | 180 | 52 | 219 | 233 | 147 | 78 | 31 |
| 8 | 226 | 97 | 34 | 52 | 217 | 33 | 157 | 119 | 22 | 48 | 170 | 68 | 55 | 107 | 112 |
| 168 | 137 | 109 | 174 | 97 | 194 | 32 | 248 | 91 | 163 | 179 | 113 | 7 | 244 | 101 | 201 |
| 45 | 61 | 243 | 185 | 11 | 102 | 110 | 197 | 2 | 86 | 104 | 249 | 15 | 194 | 33 | 27 |
| 20 | 162 | 58 | 220 | 205 | 147 | 82 | 135 | 214 | 209 | 41 | 197 | 80 | 178 | 205 | 160 |
| 113 | 181 | 78 | 2 | 62 | 243 | 89 | 45 | 74 | 142 | 48 | 160 | 126 | 86 | 96 | 209 |
| 120 | 248 | 164 | 130 | 46 | 230 | 142 | 163 | 14 | 255 | 183 | 154 | 134 | 77 | 27 | 253 |
| 39 | 227 | 25 | 156 | 150 | 136 | 7 | 174 | 106 | 237 | 24 | 10 | 85 | 243 | 57 | 143 |
| 77 | 173 | 16 | 211 | 251 | 195 | 67 | 181 | 177 | 132 | 81 | 229 | 40 | 214 | 201 | 190 |
| 119 | 116 | 81 | 219 | 50 | 79 | 120 | 227 | 40 | 91 | 157 | 192 | 68 | 161 | 33 | 32 |
| 180 | 241 | 103 | 153 | 148 | 111 | 33 | 250 | 112 | 203 | 130 | 167 | 232 | 138 | 74 | 241 |
| 104 | 24 | 18 | 201 | 209 | 173 | 61 | 33 | 105 | 153 | 2 | 214 | 246 | 115 | 100 | 227 |
| 60 | 200 | 245 | 229 | 71 | 183 | 191 | 217 | 241 | 149 | 68 | 192 | 12 | 222 | 170 | 182 |
| 175 | 155 | 62 | 93 | 103 | 238 | 34 | 147 | 88 | 235 | 167 | 77 | 59 | 185 | 34 | 150 |
| 145 | 10 | 213 | 64 | 1 | 16 | 154 | 103 | 29 | 38 | 161 | 100 | 223 | 10 | 124 | 109 |
| 28 | 216 | 48 | 200 | 130 | 168 | 236 | 135 | 7 | 205 | 79 | 174 | 125 | 249 | 95 | 61 |
| 9 | 84 | 136 | 173 | 89 | 45 | 223 | 73 | 121 | 121 | 95 | 30 | 50 | 87 | 83 | 55 |
| 138 | 136 | 203 | 88 | 11 | 221 | 89 | 64 | 120 | 252 | 24 | 10 | 211 | 162 | 7 | 219 |
| 113 | 57 | 236 | 28 | 162 | 94 | 70 | 23 | 199 | 53 | 214 | 81 | 177 | 37 | 237 | 111 |
| 56 | 225 | 106 | 159 | 78 | 248 | 193 | 200 | 56 | 137 | 203 | 188 | 71 | 214 | 96 | 136 |
| 189 | 88 | 32 | 117 | 205 | 3 | 141 | 127 | 16 | 100 | 154 | 10 | 49 | 224 | 141 | 18 |
| 210 | 17 | 32 | 186 | 145 | 151 | 26 | 167 | 117 | 179 | 172 | 246 | 48 | 156 | 181 | 238 |
| 144 | 48 | 248 | 67 | 64 | 188 | 179 | 78 | 254 | 32 | 121 | 64 | 222 | 82 | 12 | 93 |
| 108 | 200 | 178 | 233 | 53 | 216 | 75 | 128 | 216 | 226 | 1 | 133 | 150 | 212 | 40 | 175 |
| 200 | 188 | 89 | 9 | 141 | 98 | 213 | 22 | 106 | 76 | 189 | 195 | 142 | 45 | 242 | 9 |
| 7 | 169 | 129 | 139 | 249 | 188 | 99 | 248 | 140 | 148 | 72 | 199 | 210 | 155 | 112 | 228 |
| 224 | 65 | 168 | 127 | 234 | 45 | 8 | 160 | 162 | 114 | 220 | 12 | 75 | 121 | 185 | 86 |
| 187 | 250 | 75 | 216 | 22 | 153 | 186 | 210 | 25 | 174 | 239 | 192 | 101 | 254 | 29 | 130 |
| 54 | 31 | 130 | 110 | 186 | 87 | 153 | 28 | 239 | 49 | 23 | 114 | 232 | 45 | 163 | 204 |
| 152 | 0 | 240 | 56 | 95 | 126 | 221 | 41 | 117 | 99 | 148 | 18 | 56 | 84 | 162 | 39 |
| 241 | 81 | 209 | 171 | 78 | 7 | 211 | 107 | 133 | 234 | 197 | 83 | 148 | 167 | 60 | 7 |
| 78 | 105 | 21 | 39 | 153 | 82 | 59 | 9 | 212 | 72 | 3 | 117 | 248 | 56 | 138 | 112 |
| 150 | 127 | 181 | 44 | 244 | 209 | 176 | 75 | 218 | 28 | 84 | 68 | 222 | 33 | 192 | 146 |
| 176 | 19 | 226 | 102 | 130 | 22 | 182 | 188 | 94 | 62 | 174 | 38 | 192 | 7 | 96 | 92 |
| 230 | 73 | 46 | 115 | 158 | 3 | 140 | 151 | 164 | 193 | 245 | 111 | 179 | 206 | 128 | 104 |
| 144 | 201 | 57 | 67 | 254 | 120 | 38 | 71 | 237 | 27 | 27 | 106 | 76 | 253 | 138 | 35 |
| 156 | 50 | 213 | 188 | 202 | 76 | 224 | 111 | 42 | 52 | 206 | 91 | 159 | 4 | 211 | 173 |
| 207 | 57 | 173 | 15 | 111 | 39 | 196 | 89 | 125 | 127 | 174 | 20 | 212 | 83 | 238 | 59 |
| 193 | 16 | 244 | 113 | 142 | 238 | 173 | 31 | 252 | 156 | 190 | 244 | 112 | 78 | 238 | 45 |
| 134 | 75 | 225 | 115 | 10 | 176 | 157 | 12 | 220 | 65 | 99 | 122 | 70 | 44 | 164 | 113 |
| 139 | 251 | 160 | 96 | 198 | 50 | 218 | 218 | 150 | 1 | 169 | 106 | 211 | 206 | 174 | 151 |
| 182 | 107 | 74 | 9 | 218 | 51 | 193 | 98 | 130 | 121 | 242 | 15 | 185 | 225 | 19 | 39 |
| 231 | 64 | 186 | 175 | 250 | 131 | 144 | 95 | 191 | 139 | 240 | 179 | 152 | 78 | 236 | 37 |
| 152 | 55 | 241 | 176 | 146 | 73 | 36 | 206 | 217 | 45 | 77 | 72 | 153 | 88 | 216 | 110 |
| 11 | 159 | 82 | 28 | 30 | 213 | 94 | 46 | 4 | 242 | 69 | 16 | 89 | 249 | | |
| 213 | 97 | 128 | 1 | 186 | 121 | 255 | 38 | 190 | 117 | 143 | 171 | 233 | 24 | | |
| 48 | 128 | 164 | 203 | 65 | 81 | 46 | 143 | 110 | 105 | 25 | 170 | 47 | 72 | | |
| 87 | 170 | 235 | 33 | 163 | 112 | 95 | 222 | 171 | 20 | 217 | | | | | |
| 82 | 182 | 37 | 11 | 103 | 221 | 9 | 180 | 76 | 4 | 195 | | | | | |
| 185 | 65 | 141 | 230 | 210 | | | | | | | | | | | |
| 105 | 246 | 19 | 149 | 74 | | | | | | | | | | | |

DOT FORMING POSITION ASSOCIATED WITH NOZZLE NUMBERS 7 TO 14

| 122 | 130 | 24 | 182 | 112 | 76 | 60 | 114 | 83 | 219 | 26 | 102 | 88 | 148 | 21 | 229 |
|---|---|---|---|---|---|---|---|---|---|---|---|---|---|---|---|
| 28 | 197 | 63 | 17 | 244 | 219 | 7 | 78 | 125 | 180 | 52 | 219 | 233 | 147 | 78 | 31 |
| 8 | 226 | 97 | 34 | 52 | 217 | 33 | 157 | 119 | 22 | 48 | 170 | 68 | 55 | 107 | 112 |
| 168 | 137 | 109 | 174 | 97 | 194 | 32 | 248 | 91 | 163 | 179 | 113 | 7 | 244 | 101 | 201 |
| 45 | 61 | 243 | 185 | 11 | 102 | 110 | 197 | 2 | 86 | 104 | 249 | 15 | 194 | 33 | 27 |
| 20 | 162 | 58 | 220 | 205 | 147 | 82 | 135 | 214 | 209 | 41 | 197 | 80 | 178 | 205 | 160 |
| 113 | 181 | 78 | 2 | 62 | 243 | 89 | 45 | 74 | 142 | 48 | 160 | 126 | 86 | 96 | 209 |
| 120 | 248 | 164 | 130 | 46 | 230 | 142 | 163 | 14 | 255 | 183 | 154 | 134 | 77 | 27 | 253 |
| 39 | 227 | 25 | 156 | 150 | 136 | 7 | 174 | 106 | 237 | 24 | 10 | 85 | 243 | 57 | 143 |
| 77 | 173 | 16 | 211 | 251 | 195 | 67 | 181 | 177 | 132 | 81 | 229 | 40 | 214 | 201 | 190 |
| 119 | 116 | 81 | 219 | 50 | 79 | 120 | 227 | 40 | 91 | 157 | 192 | 68 | 161 | 33 | 32 |
| 180 | 241 | 103 | 153 | 148 | 111 | 33 | 250 | 112 | 203 | 130 | 167 | 232 | 138 | 74 | 241 |
| 104 | 24 | 18 | 201 | 209 | 173 | 61 | 33 | 105 | 153 | 2 | 214 | 246 | 115 | 100 | 227 |
| 60 | 200 | 245 | 229 | 71 | 183 | 191 | 217 | 241 | 149 | 68 | 192 | 12 | 222 | 170 | 182 |
| 175 | 155 | 62 | 93 | 103 | 238 | 34 | 147 | 88 | 235 | 167 | 77 | 59 | 185 | 34 | 150 |
| 145 | 10 | 213 | 64 | 1 | 16 | 154 | 103 | 29 | 38 | 161 | 100 | 223 | 10 | 124 | 109 |
| 28 | 216 | 48 | 200 | 130 | 168 | 236 | 135 | 7 | 205 | 79 | 174 | 125 | 249 | 95 | 61 |
| 9 | 84 | 136 | 173 | 89 | 45 | 223 | 73 | 121 | 121 | 95 | 30 | 50 | 87 | 83 | 55 |
| 138 | 136 | 203 | 88 | 11 | 221 | 89 | 64 | 120 | 252 | 24 | 10 | 211 | 162 | 7 | 219 |
| 113 | 57 | 236 | 28 | 162 | 94 | 70 | 23 | 199 | 53 | 214 | 81 | 177 | 37 | 237 | 111 |
| 56 | 225 | 106 | 159 | 78 | 248 | 193 | 200 | 56 | 137 | 203 | 188 | 71 | 214 | 96 | 136 |
| 189 | 88 | 32 | 117 | 205 | 3 | 141 | 127 | 16 | 100 | 154 | 10 | 49 | 224 | 141 | 18 |
| 210 | 17 | 32 | 186 | 145 | 151 | 26 | 167 | 117 | 179 | 172 | 246 | 48 | 156 | 181 | 238 |
| 144 | 48 | 248 | 67 | 64 | 188 | 179 | 78 | 254 | 32 | 121 | 64 | 222 | 82 | 12 | 93 |
| 108 | 200 | 178 | 233 | 53 | 216 | 75 | 128 | 216 | 226 | 1 | 133 | 150 | 212 | 40 | 175 |
| 200 | 188 | 89 | 9 | 141 | 98 | 213 | 22 | 106 | 76 | 189 | 195 | 142 | 45 | 242 | 9 |
| 7 | 169 | 129 | 139 | 249 | 188 | 99 | 248 | 140 | 148 | 72 | 199 | 210 | 155 | 112 | 228 |
| 224 | 65 | 168 | 127 | 234 | 45 | 8 | 160 | 162 | 114 | 220 | 12 | 75 | 121 | 185 | 86 |
| 187 | 250 | 75 | 216 | 22 | 153 | 186 | 210 | 25 | 174 | 239 | 192 | 101 | 254 | 29 | 130 |
| 54 | 31 | 130 | 110 | 186 | 87 | 153 | 28 | 239 | 49 | 23 | 114 | 232 | 45 | 163 | 204 |
| 152 | 0 | 240 | 56 | 95 | 126 | 221 | 41 | 117 | 99 | 148 | 18 | 56 | 84 | 162 | 39 |
| 241 | 81 | 209 | 171 | 78 | 7 | 211 | 107 | 133 | 234 | 197 | 83 | 148 | 167 | 60 | 7 |
| 78 | 105 | 21 | 39 | 153 | 82 | 59 | 9 | 212 | 72 | 3 | 117 | 248 | 56 | 138 | 112 |
| 150 | 127 | 181 | 44 | 244 | 209 | 176 | 75 | 218 | 28 | 84 | 68 | 222 | 33 | 192 | 146 |
| 176 | 19 | 226 | 102 | 130 | 22 | 182 | 188 | 94 | 62 | 174 | 38 | 192 | 7 | 96 | 92 |
| 230 | 73 | 46 | 115 | 158 | 3 | 140 | 151 | 164 | 193 | 245 | 111 | 179 | 206 | 128 | 104 |
| 144 | 201 | 57 | 67 | 254 | 120 | 38 | 71 | 237 | 27 | 27 | 106 | 76 | 253 | 138 | 35 |
| 156 | 50 | 213 | 188 | 202 | 76 | 224 | 111 | 42 | 52 | 206 | 91 | 159 | 4 | 211 | 173 |
| 207 | 57 | 173 | 15 | 111 | 39 | 196 | 89 | 125 | 127 | 174 | 20 | 212 | 83 | 238 | 59 |
| 193 | 16 | 244 | 113 | 142 | 238 | 173 | 31 | 252 | 156 | 190 | 244 | 112 | 78 | 238 | 45 |
| 134 | 75 | 225 | 115 | 10 | 176 | 157 | 12 | 220 | 65 | 99 | 122 | 70 | 44 | 164 | 113 |
| 139 | 251 | 160 | 96 | 198 | 50 | 218 | 218 | 150 | 1 | 169 | 106 | 211 | 206 | 174 | 151 |
| 182 | 107 | 74 | 9 | 218 | 51 | 193 | 98 | 130 | 121 | 242 | 15 | 185 | 225 | 19 | 39 |
| 231 | 64 | 186 | 175 | 250 | 131 | 144 | 95 | 191 | 139 | 240 | 179 | 152 | 78 | 236 | 37 |
| 152 | 55 | 241 | 176 | 146 | 73 | 36 | 206 | 217 | 45 | 77 | 72 | 153 | 88 | 216 | 110 |
| 11 | 159 | 82 | 28 | 30 | 213 | 94 | 46 | 4 | 242 | 69 | 16 | 89 | 249 | | |
| 213 | 97 | 128 | 1 | 186 | 121 | 255 | 38 | 190 | 117 | 143 | 171 | 233 | 24 | | |
| 48 | 128 | 164 | 203 | 65 | 81 | 46 | 143 | 110 | 105 | 25 | 170 | 47 | 72 | | |
| 87 | 170 | 235 | 33 | 163 | 112 | 95 | 222 | 171 | 20 | 217 | | | | | |
| 82 | 182 | 37 | 11 | 103 | 221 | 9 | 180 | 76 | 4 | 195 | | | | | |
| 185 | 65 | 141 | 230 | 210 | | | | | | | | | | | |
| 105 | 246 | 19 | 149 | 74 | | | | | | | | | | | |

DOT FORMING POSITION ASSOCIATED WITH NOZZLE NUMBERS 15 TO 22

| 122 | 130 | 24 | 182 | 112 | 76 | 60 | 114 | 83 | 219 | 26 | 102 | 88 | 148 | 21 | 229 |
|---|---|---|---|---|---|---|---|---|---|---|---|---|---|---|---|
| 28 | 197 | 63 | 17 | 244 | 219 | 7 | 78 | 125 | 180 | 52 | 219 | 233 | 147 | 78 | 31 |
| 8 | 226 | 97 | 34 | 52 | 217 | 33 | 157 | 119 | 22 | 48 | 170 | 68 | 55 | 107 | 112 |
| 168 | 137 | 109 | 174 | 97 | 194 | 32 | 248 | 91 | 163 | 179 | 113 | 7 | 244 | 101 | 201 |
| 45 | 61 | 243 | 185 | 11 | 102 | 110 | 197 | 2 | 86 | 104 | 249 | 15 | 194 | 33 | 27 |
| 20 | 162 | 58 | 220 | 205 | 147 | 82 | 135 | 214 | 209 | 41 | 197 | 80 | 178 | 205 | 160 |
| 113 | 181 | 78 | 2 | 62 | 243 | 89 | 45 | 74 | 142 | 48 | 160 | 126 | 86 | 96 | 209 |
| 120 | 248 | 164 | 130 | 46 | 230 | 142 | 163 | 14 | 255 | 183 | 154 | 134 | 77 | 27 | 253 |
| 39 | 227 | 25 | 156 | 150 | 136 | 7 | 174 | 106 | 237 | 24 | 10 | 85 | 243 | 57 | 143 |
| 77 | 173 | 16 | 211 | 251 | 195 | 67 | 181 | 177 | 132 | 81 | 229 | 40 | 214 | 201 | 190 |
| 119 | 116 | 81 | 219 | 50 | 79 | 120 | 227 | 40 | 91 | 157 | 192 | 68 | 161 | 33 | 32 |
| 180 | 241 | 103 | 153 | 148 | 111 | 33 | 250 | 112 | 203 | 130 | 167 | 232 | 138 | 74 | 241 |
| 104 | 24 | 18 | 201 | 209 | 173 | 61 | 33 | 105 | 153 | 2 | 214 | 246 | 115 | 100 | 227 |
| 60 | 200 | 245 | 229 | 71 | 183 | 191 | 217 | 241 | 149 | 68 | 192 | 12 | 222 | 170 | 182 |
| 175 | 155 | 62 | 93 | 103 | 238 | 34 | 147 | 88 | 235 | 167 | 77 | 59 | 185 | 34 | 150 |
| 145 | 10 | 213 | 64 | 1 | 16 | 154 | 103 | 29 | 38 | 161 | 100 | 223 | 10 | 124 | 109 |
| 28 | 216 | 48 | 200 | 130 | 168 | 236 | 135 | 7 | 205 | 79 | 174 | 125 | 249 | 95 | 61 |
| 9 | 84 | 136 | 173 | 89 | 45 | 223 | 73 | 121 | 121 | 95 | 30 | 50 | 87 | 83 | 55 |
| 138 | 136 | 203 | 88 | 11 | 221 | 89 | 64 | 120 | 252 | 24 | 10 | 211 | 162 | 7 | 219 |
| 113 | 57 | 236 | 28 | 162 | 94 | 70 | 23 | 199 | 53 | 214 | 81 | 177 | 37 | 237 | 111 |
| 56 | 225 | 106 | 159 | 78 | 248 | 193 | 200 | 56 | 137 | 203 | 188 | 71 | 214 | 96 | 136 |
| 189 | 88 | 32 | 117 | 205 | 3 | 141 | 127 | 16 | 100 | 154 | 10 | 49 | 224 | 141 | 18 |
| 210 | 17 | 32 | 186 | 145 | 151 | 26 | 167 | 117 | 179 | 172 | 246 | 48 | 156 | 181 | 238 |
| 144 | 48 | 248 | 67 | 64 | 188 | 179 | 78 | 254 | 32 | 121 | 64 | 222 | 82 | 12 | 93 |
| 108 | 200 | 178 | 233 | 53 | 216 | 75 | 128 | 216 | 226 | 1 | 133 | 150 | 212 | 40 | 175 |
| 200 | 188 | 89 | 9 | 141 | 98 | 213 | 22 | 106 | 76 | 189 | 195 | 142 | 45 | 242 | 9 |
| 7 | 169 | 129 | 139 | 249 | 188 | 99 | 248 | 140 | 148 | 72 | 199 | 210 | 155 | 112 | 228 |
| 224 | 65 | 168 | 127 | 234 | 45 | 8 | 160 | 162 | 114 | 220 | 12 | 75 | 121 | 185 | 86 |
| 187 | 250 | 75 | 216 | 22 | 153 | 186 | 210 | 25 | 174 | 239 | 192 | 101 | 254 | 29 | 130 |
| 54 | 31 | 130 | 110 | 186 | 87 | 153 | 28 | 239 | 49 | 23 | 114 | 232 | 45 | 163 | 204 |
| 152 | 0 | 240 | 56 | 95 | 126 | 221 | 41 | 117 | 99 | 148 | 18 | 56 | 84 | 162 | 39 |
| 241 | 81 | 209 | 171 | 78 | 7 | 211 | 107 | 133 | 234 | 197 | 83 | 148 | 167 | 60 | 7 |
| 78 | 105 | 21 | 39 | 153 | 82 | 59 | 9 | 212 | 72 | 3 | 117 | 248 | 56 | 138 | 112 |
| 150 | 127 | 181 | 44 | 244 | 209 | 176 | 75 | 218 | 28 | 84 | 68 | 222 | 33 | 192 | 146 |
| 176 | 19 | 226 | 102 | 130 | 22 | 182 | 188 | 94 | 62 | 174 | 38 | 192 | 7 | 96 | 92 |
| 230 | 73 | 46 | 115 | 158 | 3 | 140 | 151 | 164 | 193 | 245 | 111 | 179 | 206 | 128 | 104 |
| 144 | 201 | 57 | 67 | 254 | 120 | 38 | 71 | 237 | 27 | 27 | 106 | 76 | 253 | 138 | 35 |
| 156 | 50 | 213 | 188 | 202 | 76 | 224 | 111 | 42 | 52 | 206 | 91 | 159 | 4 | 211 | 173 |
| 207 | 57 | 173 | 15 | 111 | 39 | 196 | 89 | 125 | 127 | 174 | 20 | 212 | 83 | 238 | 59 |
| 193 | 16 | 244 | 113 | 142 | 238 | 173 | 31 | 252 | 156 | 190 | 244 | 112 | 78 | 238 | 45 |
| 134 | 75 | 225 | 115 | 10 | 176 | 157 | 12 | 220 | 65 | 99 | 122 | 70 | 44 | 164 | 113 |
| 139 | 251 | 160 | 96 | 198 | 50 | 218 | 218 | 150 | 1 | 169 | 106 | 211 | 206 | 174 | 151 |
| 182 | 107 | 74 | 9 | 218 | 51 | 193 | 98 | 130 | 121 | 242 | 15 | 185 | 225 | 19 | 39 |
| 231 | 64 | 186 | 175 | 250 | 131 | 144 | 95 | 191 | 139 | 240 | 179 | 152 | 78 | 236 | 37 |
| 152 | 55 | 241 | 176 | 146 | 73 | 36 | 206 | 217 | 45 | 77 | 72 | 153 | 88 | 216 | 110 |
| 11 | 159 | 82 | 28 | 30 | 213 | 94 | 46 | 4 | 242 | 69 | 16 | 89 | 249 | | |
| 213 | 97 | 128 | 1 | 186 | 121 | 255 | 38 | 190 | 117 | 143 | 171 | 233 | 24 | | |
| 48 | 128 | 164 | 203 | 65 | 81 | 46 | 143 | 110 | 105 | 25 | 170 | 47 | 72 | | |
| 87 | 170 | 235 | 33 | 163 | 112 | 95 | 222 | 171 | 20 | 217 | | | | | |
| 82 | 182 | 37 | 11 | 103 | 221 | 9 | 180 | 76 | 4 | 195 | | | | | |
| 185 | 65 | 141 | 230 | 210 | | | | | | | | | | | |
| 105 | 246 | 19 | 149 | 74 | | | | | | | | | | | |

DOT FORMING POSITION ASSOCIATED WITH NOZZLE NUMBERS 23 TO 29

| | | | | | | | | | | | | | | |
|---|---|---|---|---|---|---|---|---|---|---|---|---|---|---|
|122|130|24|182|112|76|60|114|83|219|26|102|88|148|21|229|
|28|197|63|17|244|219|7|78|125|180|52|219|233|147|78|31|
|8|226|97|34|52|217|33|157|119|22|48|170|68|55|107|112|
|168|137|109|174|97|194|32|248|91|163|179|113|7|244|101|201|
|45|61|243|185|11|102|110|197|2|86|104|249|15|194|33|27|
|20|162|58|220|205|147|82|135|214|209|41|197|80|178|205|160|
|113|181|78|2|62|243|89|45|74|142|48|160|126|86|96|209|
|120|248|164|130|46|230|142|163|14|255|183|154|134|77|27|253|
|39|227|25|156|150|136|7|174|106|237|24|10|85|243|57|143|
|77|173|16|211|251|195|67|181|177|132|81|229|40|214|201|190|
|119|116|81|219|50|79|120|227|40|91|157|192|68|161|33|32|
|180|241|103|153|148|111|33|250|112|203|130|167|232|138|74|241|
|104|24|18|201|209|173|61|33|105|153|2|214|246|115|100|227|
|60|200|245|229|71|183|191|217|241|149|68|192|12|222|170|182|
|175|155|62|93|103|238|34|147|88|235|167|77|59|185|34|150|
|145|10|213|64|1|16|154|103|29|38|161|100|223|10|124|109|
|28|216|48|200|130|168|236|135|7|205|79|174|125|249|95|61|
|9|84|136|173|89|45|223|73|121|121|95|30|50|87|83|55|
|138|136|203|88|11|221|89|64|120|252|24|10|211|162|7|219|
|113|57|236|28|162|94|70|23|199|53|214|81|177|37|237|111|
|56|225|106|159|78|248|193|200|56|137|203|188|71|214|96|136|
|189|88|32|117|205|3|141|127|16|100|154|10|49|224|141|18|
|210|17|32|186|145|151|26|167|117|179|172|246|48|156|181|238|
|144|48|248|67|64|188|179|78|254|32|121|64|222|82|12|93|
|108|200|178|233|53|216|75|128|216|226|1|133|150|212|40|175|
|200|188|89|9|141|98|213|22|106|76|189|195|142|45|242|9|
|7|169|129|139|249|188|99|248|140|148|72|199|210|155|112|228|
|224|65|168|127|234|45|8|160|162|114|220|12|75|121|185|86|
|187|250|75|216|22|153|186|210|25|174|239|192|101|254|29|130|
|54|31|130|110|186|87|153|28|239|49|23|114|232|45|163|204|
|152|0|240|56|95|126|221|41|117|99|148|18|56|84|162|39|
|241|81|209|171|78|7|211|107|133|234|197|83|148|167|60|7|
|78|105|21|39|153|82|59|9|212|72|3|117|248|56|138|112|
|150|127|181|44|244|209|176|75|218|28|84|68|222|33|192|146|
|176|19|226|102|130|22|182|188|94|62|174|38|192|7|96|92|
|230|73|46|115|158|3|140|151|164|193|245|111|179|206|128|104|
|144|201|57|67|254|120|38|71|237|27|27|106|76|253|138|35|
|156|50|213|188|202|76|224|111|42|52|206|91|159|4|211|173|
|207|57|173|15|111|39|196|89|125|127|174|20|212|83|238|59|
|193|16|244|113|142|238|173|31|252|156|190|244|112|78|238|45|
|134|75|225|115|10|176|157|12|220|65|99|122|70|44|164|113|
|139|251|160|96|198|50|218|218|150|1|169|106|211|206|174|151|
|182|107|74|9|218|51|193|98|130|121|242|15|185|225|19|39|
|231|64|186|175|250|131|144|95|191|139|240|179|152|78|236|37|
|152|55|241|176|146|73|36|206|217|45|77|72|153|88|216|110|
|11|159|82|28|30|213|94|46|4|242|69|16|89|249| | |
|213|97|128|1|186|121|255|38|190|117|143|171|233|24| | |
|48|128|164|203|65|81|46|143|110|105|25|170|47|72| | |
|87|170|235|33|163|112|95|222|171|20|217| | | | | |
|82|182|37|11|103|221|9|180|76|4|195| | | | | |
|185|65|141|230|210| | | | | | | | | | | |
|105|246|19|149|74| | | | | | | | | | | |

SECOND DITHER MASK D2c

| 250 | 121 | 152 | 176 | 240 | 71 | 187 | 107 | 210 | 216 | 153 | 95 | 216 | 141 | 148 | 228 |
|---|---|---|---|---|---|---|---|---|---|---|---|---|---|---|---|
| 73 | 103 | 142 | 4 | 251 | 125 | 19 | 20 | 204 | 86 | 131 | 125 | 247 | 52 | 157 | 8 |
| 131 | 219 | 220 | 27 | 175 | 208 | 156 | 134 | 242 | 18 | 171 | 151 | 191 | 45 | 230 | 91 |
| 216 | 36 | 180 | 73 | 167 | 93 | 71 | 223 | 161 | 62 | 221 | 24 | 15 | 202 | 171 | 100 |
| 163 | 43 | 254 | 156 | 129 | 72 | 228 | 173 | 27 | 60 | 222 | 246 | 133 | 169 | 151 | 19 |
| 38 | 55 | 110 | 113 | 228 | 40 | 142 | 28 | 234 | 102 | 78 | 90 | 140 | 71 | 229 | 53 |
| 226 | 133 | 191 | 2 | 175 | 236 | 202 | 28 | 187 | 93 | 161 | 110 | 239 | 53 | 209 | 179 |
| 170 | 192 | 199 | 17 | 75 | 117 | 186 | 50 | 23 | 254 | 211 | 42 | 181 | 9 | 44 | 234 |
| 146 | 201 | 132 | 96 | 238 | 75 | 45 | 114 | 213 | 222 | 131 | 5 | 192 | 233 | 164 | 83 |
| 110 | 55 | 23 | 93 | 252 | 77 | 95 | 63 | 200 | 14 | 115 | 111 | 57 | 96 | 217 | 72 |
| 220 | 52 | 182 | 176 | 151 | 35 | 221 | 193 | 141 | 41 | 235 | 122 | 169 | 91 | 134 | 14 |
| 194 | 118 | 127 | 31 | 168 | 4 | 41 | 127 | 136 | 80 | 154 | 44 | 237 | 15 | 91 | 118 |
| 198 | 9 | 69 | 122 | 243 | 94 | 155 | 13 | 200 | 74 | 7 | 148 | 253 | 44 | 194 | 182 |
| 65 | 73 | 246 | 101 | 76 | 55 | 195 | 90 | 242 | 22 | 73 | 65 | 13 | 94 | 176 | 55 |
| 230 | 68 | 149 | 30 | 190 | 203 | 108 | 60 | 175 | 192 | 227 | 25 | 146 | 98 | 106 | 63 |
| 138 | 138 | 210 | 192 | 1 | 144 | 147 | 230 | 27 | 166 | 155 | 227 | 221 | 137 | 116 | 236 |
| 73 | 122 | 125 | 106 | 207 | 74 | 248 | 41 | 19 | 111 | 158 | 79 | 204 | 233 | 174 | 16 |
| 8 | 207 | 112 | 252 | 72 | 168 | 216 | 196 | 99 | 244 | 77 | 153 | 41 | 210 | 67 | 178 |
| 202 | 35 | 232 | 18 | 25 | 120 | 159 | 13 | 191 | 242 | 54 | 2 | 235 | 61 | 15 | 119 |
| 80 | 175 | 229 | 146 | 125 | 212 | 49 | 141 | 176 | 171 | 196 | 199 | 145 | 155 | 229 | 230 |
| 106 | 117 | 166 | 52 | 138 | 210 | 222 | 93 | 105 | 30 | 227 | 80 | 131 | 107 | 157 | 29 |
| 147 | 201 | 20 | 229 | 172 | 30 | 92 | 240 | 10 | 213 | 105 | 91 | 30 | 251 | 92 | 130 |
| 227 | 2 | 52 | 73 | 188 | 38 | 42 | 54 | 166 | 66 | 204 | 180 | 79 | 43 | 210 | 126 |
| 83 | 156 | 241 | 174 | 34 | 244 | 119 | 185 | 254 | 139 | 64 | 171 | 192 | 190 | 6 | 200 |
| 145 | 82 | 200 | 115 | 75 | 98 | 106 | 10 | 228 | 108 | 2 | 15 | 181 | 94 | 56 | 56 |
| 134 | 241 | 40 | 42 | 71 | 199 | 161 | 103 | 47 | 177 | 119 | 242 | 72 | 146 | 226 | 44 |
| 9 | 47 | 153 | 16 | 250 | 65 | 121 | 125 | 161 | 25 | 89 | 76 | 219 | 33 | 136 | 105 |
| 173 | 160 | 89 | 222 | 199 | 139 | 3 | 230 | 83 | 208 | 164 | 44 | 29 | 215 | 106 | 181 |
| 192 | 122 | 81 | 89 | 23 | 26 | 191 | 83 | 27 | 47 | 240 | 65 | 108 | 126 | 31 | 2 |
| 17 | 98 | 43 | 197 | 99 | 174 | 66 | 89 | 205 | 136 | 7 | 201 | 181 | 132 | 76 | 239 |
| 144 | 128 | 239 | 183 | 89 | 254 | 219 | 168 | 109 | 226 | 140 | 146 | 52 | 212 | 155 | 166 |
| 202 | 160 | 115 | 223 | 20 | 19 | 117 | 186 | 39 | 247 | 103 | 162 | 54 | 222 | 16 | 18 |
| 63 | 228 | 17 | 162 | 129 | 205 | 48 | 132 | 202 | 195 | 2 | 240 | 247 | 179 | 114 | 235 |
| 50 | 197 | 80 | 97 | 201 | 234 | 75 | 145 | 117 | 63 | 18 | 138 | 121 | 74 | 91 | 206 |
| 142 | 137 | 215 | 220 | 93 | 140 | 152 | 250 | 66 | 180 | 140 | 156 | 166 | 93 | 68 | 210 |
| 123 | 134 | 7 | 176 | 51 | 6 | 33 | 200 | 57 | 223 | 191 | 172 | 71 | 229 | 21 | 164 |
| 94 | 249 | 35 | 180 | 253 | 233 | 23 | 184 | 225 | 140 | 16 | 218 | 47 | 255 | 89 | 148 |
| 43 | 82 | 100 | 214 | 89 | 124 | 112 | 161 | 5 | 86 | 93 | 141 | 46 | 7 | 98 | 205 |
| 164 | 165 | 113 | 92 | 58 | 146 | 142 | 196 | 66 | 234 | 114 | 124 | 173 | 190 | 222 | 166 |
| 75 | 22 | 126 | 150 | 24 | 243 | 55 | 44 | 218 | 185 | 72 | 247 | 8 | 110 | 120 | 64 |
| 64 | 176 | 188 | 216 | 5 | 238 | 87 | 57 | 177 | 166 | 44 | 223 | 31 | 145 | 94 | 214 |
| 16 | 252 | 37 | 118 | 75 | 61 | 95 | 225 | 27 | 1 | 46 | 130 | 88 | 215 | 51 | 170 |
| 103 | 201 | 28 | 34 | 157 | 145 | 114 | 192 | 51 | 215 | 221 | 56 | 106 | 247 | 7 | 133 |
| 103 | 69 | 59 | 181 | 122 | 140 | 16 | 102 | 63 | 147 | 113 | 184 | 25 | 83 | 108 | 40 |
| 65 | 142 | 210 | 230 | 59 | 160 | 11 | 239 | 135 | 132 | 25 | 159 | 66 | 175 | 134 | 197 |
| 138 | 152 | 209 | 26 | 158 | 210 | 222 | 43 | 132 | 241 | 196 | 15 | 216 | 249 | | |
| 119 | 176 | 33 | 4 | 92 | 200 | 253 | 101 | 96 | 196 | 49 | 223 | 170 | 64 | | |
| 171 | 104 | 252 | 191 | 188 | 66 | 169 | 119 | 233 | 85 | 148 | 150 | 170 | 59 | | |
| 18 | 217 | 161 | 73 | 62 | 182 | 20 | 240 | 70 | 45 | 116 | | | | | |
| 200 | 151 | 155 | 8 | 221 | 207 | 117 | 149 | 194 | 3 | 251 | | | | | |
| 78 | 123 | 34 | 242 | 103 | | | | | | | | | | | |
| 218 | 240 | 132 | 99 | 187 | | | | | | | | | | | |

DOT FORMING POSITION WHEN DOT RECORDING RATE IS 50%

FIG. 26

DOT FORMING POSITION ASSOCIATED WITH NOZZLE NUMBERS 0 TO 6

| | | | | | | | | | | | | | | |
|---|---|---|---|---|---|---|---|---|---|---|---|---|---|---|
|250|121|152|176|240| 71|187|107|210|216|153| 95|216|141|148|228|
| 73|103|142|  4|251|125| 19| 20|204| 86|131|125|247| 52|157|  8|
|131|219|220| 27|175|208|156|134|242| 18|171|151|191| 45|230| 91|
|216| 36|180| 73|167| 93| 71|223|161| 62|221| 24| 15|202|171|100|
|163| 43|254|156|129| 72|228|173| 27| 60|222|246|133|169|151| 19|
| 38| 55|110|113|228| 40|142| 28|234|102| 78| 90|140| 71|229| 53|
|226|133|191|  2|175|236|202| 28|187| 93|161|110|239| 53|209|179|
|170|192|199| 17| 75|117|186| 50| 23|254|211| 42|181|  9| 44|234|
|146|201|132| 96|238| 75| 45|114|213|222|131|  5|192|233|164| 83|
|110| 55| 23| 93|252| 77| 95| 63|200| 14|115|111| 57| 96|217| 72|
|220| 52|182|176|151| 35|221|193|141| 41|235|122|169| 91|134| 14|
|194|118|127| 31|168|  4| 41|127|136| 80|154| 44|237| 15| 91|118|
|198|  9| 69|122|243| 94|155| 13|200| 74| 7|148|253| 44|194|182|
| 65| 73|246|101| 76| 55|195| 90|242| 22| 73| 65| 13| 94|176| 55|
|230| 68|149| 30|190|203|108| 60|175|192|227| 25|146| 98|106| 63|
|138|138|210|192|  1|144|147|230| 27|166|155|227|221|137|116|236|
| 73|122|125|106|207| 74|248| 41| 19|111|158| 79|204|233|174| 16|
|  8|207|112|252| 72|168|216|196| 99|244| 77|153| 41|210| 67|178|
|202| 35|232| 18| 25|120|159| 13|191|242| 54|  2|235| 61| 15|119|
| 80|175|229|146|125|212| 49|141|176|171|196|199|145|155|229|230|
|106|117|166| 52|138|210|222| 93|105| 30|227| 80|131|107|157| 29|
|147|201| 20|229|172| 30| 92|240| 10|213|105| 91| 30|251| 92|130|
|227|  2| 52| 73|188| 38| 42| 54|166| 66|204|180| 79| 43|210|126|
| 83|156|241|174| 34|244|119|185|254|139| 64|171|192|190|  6|200|
|145| 82|200|115| 75| 98|106| 10|228|108|  2| 15|181| 94| 56| 56|
|134|241| 40| 42| 71|199|161| 103| 47|177|119|242| 72|146|226| 44|
|  9| 47|153| 16|250| 65|121|125|161| 25| 89| 76|219| 33|136|105|
|173|160| 89|222|199|139|  3|230| 83|208|164| 44| 29|215|106|181|
|192|122| 81| 89| 23| 26|191| 83| 27| 47|240| 65|108|126| 31|  2|
| 17| 98| 43|197| 99|174| 66| 89|205|136|  7|201|181|132| 76|239|
|144|128|239|183| 89|254|219|168|109|226|140|146| 52|212|155|166|
|202|160|115|223| 20| 19|117|186| 39|247|103|162| 54|222| 16| 18|
| 63|228| 17|162|129|205| 48|132|202|195|  2|240|247|179|114|235|
| 50|197| 80| 97|201|234| 75|145|117| 63| 18|138|121| 74| 91|206|
|142|137|215|220| 93|140|152|250| 66|180|140|156|166| 93| 68|210|
|123|134|  7|176| 51|  6| 33|200| 57|223|191|172| 71|229| 21|164|
| 94|249| 35|180|253|233| 23|184|225|140| 16|218| 47|255| 89|148|
| 43| 82|100|214| 89|124|112|161|  5| 86| 93|141| 46|  7| 98|205|
|164|165|113| 92| 58|146|142|196| 66|234|114| 124|173|190|222|166|
| 75| 22|126|150| 24|243| 55| 44|218|185| 72|247|  8|110|120| 64|
| 64|176|188|216|  5|238| 87| 57|177|166| 44|223| 31|145| 94|214|
| 16|252| 37|118| 75| 61| 95|225| 27|  1| 46|130| 88|215| 51|170|
|103|201| 28| 34|157|145|114|192| 51|215|221| 56|106|247|  7|133|
|103| 69| 59|181|122|140| 16|102| 63|147|113|184| 25| 83|108| 40|
| 65|142|210|230| 59|160| 11|239|135|132| 25|159| 66|175|134|197|
|138|152|209| 26|158|210|222| 43|132|241|196| 15|216|249| | |
|119|176| 33|  4| 92|200|253|101| 96|196| 49|223|170| 64| | |
|171|104|252|191|188| 66|169|119|233| 85|148|150|170| 59| | |
| 18|217|161| 73| 62|182| 20|240| 70| 45|116| | | | | |
|200|151|155|  8|221|207| 117|149|194|  3|251| | | | | |
| 78|123| 34|242|103| | | | | | | | | | | |
|218|240|132| 99|187| | | | | | | | | | | |

DOT FORMING POSITION ASSOCIATED WITH NOZZLE NUMBERS 7 TO 14

| 250 | 121 | 152 | 176 | 240 | 71 | 187 | 107 | 210 | 216 | 153 | 95 | 216 | 141 | 148 | 228 |
|---|---|---|---|---|---|---|---|---|---|---|---|---|---|---|---|
| 73 | 103 | 142 | 4 | 251 | 125 | 19 | 20 | 204 | 86 | 131 | 125 | 247 | 52 | 157 | 8 |
| 131 | 219 | 220 | 27 | 175 | 208 | 156 | 134 | 242 | 18 | 171 | 151 | 191 | 45 | 230 | 91 |
| 216 | 36 | 180 | 73 | 167 | 93 | 71 | 223 | 161 | 62 | 221 | 24 | 15 | 202 | 171 | 100 |
| 163 | 43 | 254 | 156 | 129 | 72 | 228 | 173 | 27 | 60 | 222 | 246 | 133 | 169 | 151 | 19 |
| 38 | 55 | 110 | 113 | 228 | 40 | 142 | 28 | 234 | 102 | 78 | 90 | 140 | 71 | 229 | 53 |
| 226 | 133 | 191 | 2 | 175 | 236 | 202 | 28 | 187 | 93 | 161 | 110 | 239 | 53 | 209 | 179 |
| 170 | 192 | 199 | 17 | 75 | 117 | 186 | 50 | 23 | 254 | 211 | 42 | 181 | 9 | 44 | 234 |
| 146 | 201 | 132 | 96 | 238 | 75 | 45 | 114 | 213 | 222 | 131 | 5 | 192 | 233 | 164 | 83 |
| 110 | 55 | 23 | 93 | 252 | 77 | 95 | 63 | 200 | 14 | 115 | 111 | 57 | 96 | 217 | 72 |
| 220 | 52 | 182 | 176 | 151 | 35 | 221 | 193 | 141 | 41 | 235 | 122 | 169 | 91 | 134 | 14 |
| 194 | 118 | 127 | 31 | 168 | 4 | 41 | 127 | 136 | 80 | 154 | 44 | 237 | 15 | 91 | 118 |
| 198 | 9 | 69 | 122 | 243 | 94 | 155 | 13 | 200 | 74 | 7 | 148 | 253 | 44 | 194 | 182 |
| 65 | 73 | 246 | 101 | 76 | 55 | 195 | 90 | 242 | 22 | 73 | 65 | 13 | 94 | 176 | 55 |
| 230 | 68 | 149 | 30 | 190 | 203 | 108 | 60 | 175 | 192 | 227 | 25 | 146 | 98 | 106 | 63 |
| 138 | 138 | 210 | 192 | 1 | 144 | 147 | 230 | 27 | 166 | 155 | 227 | 221 | 137 | 116 | 236 |
| 73 | 122 | 125 | 106 | 207 | 74 | 248 | 41 | 19 | 111 | 158 | 79 | 204 | 233 | 174 | 16 |
| 8 | 207 | 112 | 252 | 72 | 168 | 216 | 196 | 99 | 244 | 77 | 153 | 41 | 210 | 67 | 178 |
| 202 | 35 | 232 | 18 | 25 | 120 | 159 | 13 | 191 | 242 | 54 | 2 | 235 | 61 | 15 | 119 |
| 80 | 175 | 229 | 146 | 125 | 212 | 49 | 141 | 176 | 171 | 196 | 199 | 145 | 155 | 229 | 230 |
| 106 | 117 | 166 | 52 | 138 | 210 | 222 | 93 | 105 | 30 | 227 | 80 | 131 | 107 | 157 | 29 |
| 147 | 201 | 20 | 229 | 172 | 30 | 92 | 240 | 10 | 213 | 105 | 91 | 30 | 251 | 92 | 130 |
| 227 | 2 | 52 | 73 | 188 | 38 | 42 | 54 | 166 | 66 | 204 | 180 | 79 | 43 | 210 | 126 |
| 83 | 156 | 241 | 174 | 34 | 244 | 119 | 185 | 254 | 139 | 64 | 171 | 192 | 190 | 6 | 200 |
| 145 | 82 | 200 | 115 | 75 | 98 | 106 | 10 | 228 | 108 | 2 | 15 | 181 | 94 | 56 | 56 |
| 134 | 241 | 40 | 42 | 71 | 199 | 161 | 103 | 47 | 177 | 119 | 242 | 72 | 146 | 226 | 44 |
| 9 | 47 | 153 | 16 | 250 | 65 | 121 | 125 | 161 | 25 | 89 | 76 | 219 | 33 | 136 | 105 |
| 173 | 160 | 89 | 222 | 199 | 139 | 3 | 230 | 83 | 208 | 164 | 44 | 29 | 215 | 106 | 181 |
| 192 | 122 | 81 | 89 | 23 | 26 | 191 | 83 | 27 | 47 | 240 | 65 | 108 | 126 | 31 | 2 |
| 17 | 98 | 43 | 197 | 99 | 174 | 66 | 89 | 205 | 136 | 7 | 201 | 181 | 132 | 76 | 239 |
| 144 | 128 | 239 | 183 | 89 | 254 | 219 | 168 | 109 | 226 | 140 | 146 | 52 | 212 | 155 | 166 |
| 202 | 160 | 115 | 223 | 20 | 19 | 117 | 186 | 39 | 247 | 103 | 162 | 54 | 222 | 16 | 18 |
| 63 | 228 | 17 | 162 | 129 | 205 | 48 | 132 | 202 | 195 | 2 | 240 | 247 | 179 | 114 | 235 |
| 50 | 197 | 80 | 97 | 201 | 234 | 75 | 145 | 117 | 63 | 18 | 138 | 121 | 74 | 91 | 206 |
| 142 | 137 | 215 | 220 | 93 | 140 | 152 | 250 | 66 | 180 | 140 | 156 | 166 | 93 | 68 | 210 |
| 123 | 134 | 7 | 176 | 51 | 6 | 33 | 200 | 57 | 223 | 191 | 172 | 71 | 229 | 21 | 164 |
| 94 | 249 | 35 | 180 | 253 | 233 | 23 | 184 | 225 | 140 | 16 | 218 | 47 | 255 | 89 | 148 |
| 43 | 82 | 100 | 214 | 89 | 124 | 112 | 161 | 5 | 86 | 93 | 141 | 46 | 7 | 98 | 205 |
| 164 | 165 | 113 | 92 | 58 | 146 | 142 | 196 | 66 | 234 | 114 | 124 | 173 | 190 | 222 | 166 |
| 75 | 22 | 126 | 150 | 24 | 243 | 55 | 44 | 218 | 185 | 72 | 247 | 8 | 110 | 120 | 64 |
| 64 | 176 | 188 | 216 | 5 | 238 | 87 | 57 | 177 | 166 | 44 | 223 | 31 | 145 | 94 | 214 |
| 16 | 252 | 37 | 118 | 75 | 61 | 95 | 225 | 27 | 1 | 46 | 130 | 88 | 215 | 51 | 170 |
| 103 | 201 | 28 | 34 | 157 | 145 | 114 | 192 | 51 | 215 | 221 | 56 | 106 | 247 | 7 | 133 |
| 103 | 69 | 59 | 181 | 122 | 140 | 16 | 102 | 63 | 147 | 113 | 184 | 25 | 83 | 108 | 40 |
| 65 | 142 | 210 | 230 | 59 | 160 | 11 | 239 | 135 | 132 | 25 | 159 | 66 | 175 | 134 | 197 |
| 138 | 152 | 209 | 26 | 158 | 210 | 222 | 43 | 132 | 241 | 196 | 15 | 216 | 249 | | |
| 119 | 176 | 33 | 4 | 92 | 200 | 253 | 101 | 96 | 196 | 49 | 223 | 170 | 64 | | |
| 171 | 104 | 252 | 191 | 188 | 66 | 169 | 119 | 233 | 85 | 148 | 150 | 170 | 59 | | |
| 18 | 217 | 161 | 73 | 62 | 182 | 20 | 240 | 70 | 45 | 116 | | | | | |
| 200 | 151 | 155 | 8 | 221 | 207 | 117 | 149 | 194 | 3 | 251 | | | | | |
| 78 | 123 | 34 | 242 | 103 | | | | | | | | | | | |
| 218 | 240 | 132 | 99 | 187 | | | | | | | | | | | |

DOT FORMING POSITION ASSOCIATED WITH NOZZLE NUMBERS 15 TO 22

| 250 | 121 | 152 | 176 | 240 | 71 | 187 | 107 | 210 | 216 | 153 | 95 | 216 | 141 | 148 | 228 |
|---|---|---|---|---|---|---|---|---|---|---|---|---|---|---|---|
| 73 | 103 | 142 | 4 | 251 | 125 | 19 | 20 | 204 | 86 | 131 | 125 | 247 | 52 | 157 | 8 |
| 131 | 219 | 220 | 27 | 175 | 208 | 156 | 134 | 242 | 18 | 171 | 151 | 191 | 45 | 230 | 91 |
| 216 | 36 | 180 | 73 | 167 | 93 | 71 | 223 | 161 | 62 | 221 | 24 | 15 | 202 | 171 | 100 |
| 163 | 43 | 254 | 156 | 129 | 72 | 228 | 173 | 27 | 60 | 222 | 246 | 133 | 169 | 151 | 19 |
| 38 | 55 | 110 | 113 | 228 | 40 | 142 | 28 | 234 | 102 | 78 | 90 | 140 | 71 | 229 | 53 |
| 226 | 133 | 191 | 2 | 175 | 236 | 202 | 28 | 187 | 93 | 161 | 110 | 239 | 53 | 209 | 179 |
| 170 | 192 | 199 | 17 | 75 | 117 | 186 | 50 | 23 | 254 | 211 | 42 | 181 | 9 | 44 | 234 |
| 146 | 201 | 132 | 96 | 238 | 75 | 45 | 114 | 213 | 222 | 131 | 5 | 192 | 233 | 164 | 83 |
| 110 | 55 | 23 | 93 | 252 | 77 | 95 | 63 | 200 | 14 | 115 | 111 | 57 | 96 | 217 | 72 |
| 220 | 52 | 182 | 176 | 151 | 35 | 221 | 193 | 141 | 41 | 235 | 122 | 169 | 91 | 134 | 14 |
| 194 | 118 | 127 | 31 | 168 | 4 | 41 | 127 | 136 | 80 | 154 | 44 | 237 | 15 | 91 | 118 |
| 198 | 9 | 69 | 122 | 243 | 94 | 155 | 13 | 200 | 74 | 7 | 148 | 253 | 44 | 194 | 182 |
| 65 | 73 | 246 | 101 | 76 | 55 | 195 | 90 | 242 | 22 | 73 | 65 | 13 | 94 | 176 | 55 |
| 230 | 68 | 149 | 30 | 190 | 203 | 108 | 60 | 175 | 192 | 227 | 25 | 146 | 98 | 106 | 63 |
| 138 | 138 | 210 | 192 | 1 | 144 | 147 | 230 | 27 | 166 | 155 | 227 | 221 | 137 | 116 | 236 |
| 73 | 122 | 125 | 106 | 207 | 74 | 248 | 41 | 19 | 111 | 158 | 79 | 204 | 233 | 174 | 16 |
| 8 | 207 | 112 | 252 | 72 | 168 | 216 | 196 | 99 | 244 | 77 | 153 | 41 | 210 | 67 | 178 |
| 202 | 35 | 232 | 18 | 25 | 120 | 159 | 13 | 191 | 242 | 54 | 2 | 235 | 61 | 15 | 119 |
| 80 | 175 | 229 | 146 | 125 | 212 | 49 | 141 | 176 | 171 | 196 | 199 | 145 | 155 | 229 | 230 |
| 106 | 117 | 166 | 52 | 138 | 210 | 222 | 93 | 105 | 30 | 227 | 80 | 131 | 107 | 157 | 29 |
| 147 | 201 | 20 | 229 | 172 | 30 | 92 | 240 | 10 | 213 | 105 | 91 | 30 | 251 | 92 | 130 |
| 227 | 2 | 52 | 73 | 188 | 38 | 42 | 54 | 166 | 66 | 204 | 180 | 79 | 43 | 210 | 126 |
| 83 | 156 | 241 | 174 | 34 | 244 | 119 | 185 | 254 | 139 | 64 | 171 | 192 | 190 | 6 | 200 |
| 145 | 82 | 200 | 115 | 75 | 98 | 106 | 10 | 228 | 108 | 2 | 15 | 181 | 94 | 56 | 56 |
| 134 | 241 | 40 | 42 | 71 | 199 | 161 | 103 | 47 | 177 | 119 | 242 | 72 | 146 | 226 | 44 |
| 9 | 47 | 153 | 16 | 250 | 65 | 121 | 125 | 161 | 25 | 89 | 76 | 219 | 33 | 136 | 105 |
| 173 | 160 | 89 | 222 | 199 | 139 | 3 | 230 | 83 | 208 | 164 | 44 | 29 | 215 | 106 | 181 |
| 192 | 122 | 81 | 89 | 23 | 26 | 191 | 83 | 27 | 47 | 240 | 65 | 108 | 126 | 31 | 2 |
| 17 | 98 | 43 | 197 | 99 | 174 | 66 | 89 | 205 | 136 | 7 | 201 | 181 | 132 | 76 | 239 |
| 144 | 128 | 239 | 183 | 89 | 254 | 219 | 168 | 109 | 226 | 140 | 146 | 52 | 212 | 155 | 166 |
| 202 | 160 | 115 | 223 | 20 | 19 | 117 | 186 | 39 | 247 | 103 | 162 | 54 | 222 | 16 | 18 |
| 63 | 228 | 17 | 162 | 129 | 205 | 48 | 132 | 202 | 195 | 2 | 240 | 247 | 179 | 114 | 235 |
| 50 | 197 | 80 | 97 | 201 | 234 | 75 | 145 | 117 | 63 | 18 | 138 | 121 | 74 | 91 | 206 |
| 142 | 137 | 215 | 220 | 93 | 140 | 152 | 250 | 66 | 180 | 140 | 156 | 166 | 93 | 68 | 210 |
| 123 | 134 | 7 | 176 | 51 | 6 | 33 | 200 | 57 | 223 | 191 | 172 | 71 | 229 | 21 | 164 |
| 94 | 249 | 35 | 180 | 253 | 233 | 23 | 184 | 225 | 140 | 16 | 218 | 47 | 255 | 89 | 148 |
| 43 | 82 | 100 | 214 | 89 | 124 | 112 | 161 | 5 | 86 | 93 | 141 | 46 | 7 | 98 | 205 |
| 164 | 165 | 113 | 92 | 58 | 146 | 142 | 196 | 66 | 234 | 114 | 124 | 173 | 190 | 222 | 166 |
| 75 | 22 | 126 | 150 | 24 | 243 | 55 | 44 | 218 | 185 | 72 | 247 | 8 | 110 | 120 | 64 |
| 64 | 176 | 188 | 216 | 5 | 238 | 87 | 57 | 177 | 166 | 44 | 223 | 31 | 145 | 94 | 214 |
| 16 | 252 | 37 | 118 | 75 | 61 | 95 | 225 | 27 | 1 | 46 | 130 | 88 | 215 | 51 | 170 |
| 103 | 201 | 28 | 34 | 157 | 145 | 114 | 192 | 51 | 215 | 221 | 56 | 106 | 247 | 7 | 133 |
| 103 | 69 | 59 | 181 | 122 | 140 | 16 | 102 | 63 | 147 | 113 | 184 | 25 | 83 | 108 | 40 |
| 65 | 142 | 210 | 230 | 59 | 160 | 11 | 239 | 135 | 132 | 25 | 159 | 66 | 175 | 134 | 197 |
| 138 | 152 | 209 | 26 | 158 | 210 | 222 | 43 | 132 | 241 | 196 | 15 | 216 | 249 | | |
| 119 | 176 | 33 | 4 | 92 | 200 | 253 | 101 | 96 | 196 | 49 | 223 | 170 | 64 | | |
| 171 | 104 | 252 | 191 | 188 | 66 | 169 | 119 | 233 | 85 | 148 | 150 | 170 | 59 | | |
| 18 | 217 | 161 | 73 | 62 | 182 | 20 | 240 | 70 | 45 | 116 | | | | | |
| 200 | 151 | 155 | 8 | 221 | 207 | 117 | 149 | 194 | 3 | 251 | | | | | |
| 78 | 123 | 34 | 242 | 103 | | | | | | | | | | | |
| 218 | 240 | 132 | 99 | 187 | | | | | | | | | | | |

DOT FORMING POSITION ASSOCIATED WITH NOZZLE NUMBERS 23 TO 29

| | | | | | | | | | | | | | | |
|---|---|---|---|---|---|---|---|---|---|---|---|---|---|---|
| 250 | 121 | 152 | 176 | 240 | 71 | 187 | 107 | 210 | 216 | 153 | 95 | 216 | 141 | 148 | 228 |
| 73 | 103 | 142 | 4 | 251 | 125 | 19 | 20 | 204 | 86 | 131 | 125 | 247 | 52 | 157 | 8 |
| 131 | 219 | 220 | 27 | 175 | 208 | 156 | 134 | 242 | 18 | 171 | 151 | 191 | 45 | 230 | 91 |
| 216 | 36 | 180 | 73 | 167 | 93 | 71 | 223 | 161 | 62 | 221 | 24 | 15 | 202 | 171 | 100 |
| 163 | 43 | 254 | 156 | 129 | 72 | 228 | 173 | 27 | 60 | 222 | 246 | 133 | 169 | 151 | 19 |
| 38 | 55 | 110 | 113 | 228 | 40 | 142 | 28 | 234 | 102 | 78 | 90 | 140 | 71 | 229 | 53 |
| 226 | 133 | 191 | 2 | 175 | 236 | 202 | 28 | 187 | 93 | 161 | 110 | 239 | 53 | 209 | 179 |
| 170 | 192 | 199 | 17 | 75 | 117 | 186 | 50 | 23 | 254 | 211 | 42 | 181 | 9 | 44 | 234 |
| 146 | 201 | 132 | 96 | 238 | 75 | 45 | 114 | 213 | 222 | 131 | 5 | 192 | 233 | 164 | 83 |
| 110 | 55 | 23 | 93 | 252 | 77 | 95 | 63 | 200 | 14 | 115 | 111 | 57 | 96 | 217 | 72 |
| 220 | 52 | 182 | 176 | 151 | 35 | 221 | 193 | 141 | 41 | 235 | 122 | 169 | 91 | 134 | 14 |
| 194 | 118 | 127 | 31 | 168 | 4 | 41 | 127 | 136 | 80 | 154 | 44 | 237 | 15 | 91 | 118 |
| 198 | 9 | 69 | 122 | 243 | 94 | 155 | 13 | 200 | 74 | 7 | 148 | 253 | 44 | 194 | 182 |
| 65 | 73 | 246 | 101 | 76 | 55 | 195 | 90 | 242 | 22 | 73 | 65 | 13 | 94 | 176 | 55 |
| 230 | 68 | 149 | 30 | 190 | 203 | 108 | 60 | 175 | 192 | 227 | 25 | 146 | 98 | 106 | 63 |
| 138 | 138 | 210 | 192 | 1 | 144 | 147 | 230 | 27 | 166 | 155 | 227 | 221 | 137 | 116 | 236 |
| 73 | 122 | 125 | 106 | 207 | 74 | 248 | 41 | 19 | 111 | 158 | 79 | 204 | 233 | 174 | 16 |
| 8 | 207 | 112 | 252 | 72 | 168 | 216 | 196 | 99 | 244 | 77 | 153 | 41 | 210 | 67 | 178 |
| 202 | 35 | 232 | 18 | 25 | 120 | 159 | 13 | 191 | 242 | 54 | 2 | 235 | 61 | 15 | 119 |
| 80 | 175 | 229 | 146 | 125 | 212 | 49 | 141 | 176 | 171 | 196 | 199 | 145 | 155 | 229 | 230 |
| 106 | 117 | 166 | 52 | 138 | 210 | 222 | 93 | 105 | 30 | 227 | 80 | 131 | 107 | 157 | 29 |
| 147 | 201 | 20 | 229 | 172 | 30 | 92 | 240 | 10 | 213 | 105 | 91 | 30 | 251 | 92 | 130 |
| 227 | 2 | 52 | 73 | 188 | 38 | 42 | 54 | 166 | 66 | 204 | 180 | 79 | 43 | 210 | 126 |
| 83 | 156 | 241 | 174 | 34 | 244 | 119 | 185 | 254 | 139 | 64 | 171 | 192 | 190 | 6 | 200 |
| 145 | 82 | 200 | 115 | 75 | 98 | 106 | 10 | 228 | 108 | 2 | 15 | 181 | 94 | 56 | 56 |
| 134 | 241 | 40 | 42 | 71 | 199 | 161 | 103 | 47 | 177 | 119 | 242 | 72 | 146 | 226 | 44 |
| 9 | 47 | 153 | 16 | 250 | 65 | 121 | 125 | 161 | 25 | 89 | 76 | 219 | 33 | 136 | 105 |
| 173 | 160 | 89 | 222 | 199 | 139 | 3 | 230 | 83 | 208 | 164 | 44 | 29 | 215 | 106 | 181 |
| 192 | 122 | 81 | 89 | 23 | 26 | 191 | 83 | 27 | 47 | 240 | 65 | 108 | 126 | 31 | 2 |
| 17 | 98 | 43 | 197 | 99 | 174 | 66 | 89 | 205 | 136 | 7 | 201 | 181 | 132 | 76 | 239 |
| 144 | 128 | 239 | 183 | 89 | 254 | 219 | 168 | 109 | 226 | 140 | 146 | 52 | 212 | 155 | 166 |
| 202 | 160 | 115 | 223 | 20 | 19 | 117 | 186 | 39 | 247 | 103 | 162 | 54 | 222 | 16 | 18 |
| 63 | 228 | 17 | 162 | 129 | 205 | 48 | 132 | 202 | 195 | 2 | 240 | 247 | 179 | 114 | 235 |
| 50 | 197 | 80 | 97 | 201 | 234 | 75 | 145 | 117 | 63 | 18 | 138 | 121 | 74 | 91 | 206 |
| 142 | 137 | 215 | 220 | 93 | 140 | 152 | 250 | 66 | 180 | 140 | 156 | 166 | 93 | 68 | 210 |
| 123 | 134 | 7 | 176 | 51 | 6 | 33 | 200 | 57 | 223 | 191 | 172 | 71 | 229 | 21 | 164 |
| 94 | 249 | 35 | 180 | 253 | 233 | 23 | 184 | 225 | 140 | 16 | 218 | 47 | 255 | 89 | 148 |
| 43 | 82 | 100 | 214 | 89 | 124 | 112 | 161 | 5 | 86 | 93 | 141 | 46 | 7 | 98 | 205 |
| 164 | 165 | 113 | 92 | 58 | 146 | 142 | 196 | 66 | 234 | 114 | 124 | 173 | 190 | 222 | 166 |
| 75 | 22 | 126 | 150 | 24 | 243 | 55 | 44 | 218 | 185 | 72 | 247 | 8 | 110 | 120 | 64 |
| 64 | 176 | 188 | 216 | 5 | 238 | 87 | 57 | 177 | 166 | 44 | 223 | 31 | 145 | 94 | 214 |
| 16 | 252 | 37 | 118 | 75 | 61 | 95 | 225 | 27 | 1 | 46 | 130 | 88 | 215 | 51 | 170 |
| 103 | 201 | 28 | 34 | 157 | 145 | 114 | 192 | 51 | 215 | 221 | 56 | 106 | 247 | 7 | 133 |
| 103 | 69 | 59 | 181 | 122 | 140 | 16 | 102 | 63 | 147 | 113 | 184 | 25 | 83 | 108 | 40 |
| 65 | 142 | 210 | 230 | 59 | 160 | 11 | 239 | 135 | 132 | 25 | 159 | 66 | 175 | 134 | 197 |
| 138 | 152 | 209 | 26 | 158 | 210 | 222 | 43 | 132 | 241 | 196 | 15 | 216 | 249 | | |
| 119 | 176 | 33 | 4 | 92 | 200 | 253 | 101 | 96 | 196 | 49 | 223 | 170 | 64 | | |
| 171 | 104 | 252 | 191 | 188 | 66 | 169 | 119 | 233 | 85 | 148 | 150 | 170 | 59 | | |
| 18 | 217 | 161 | 73 | 62 | 182 | 20 | 240 | 70 | 45 | 116 | | | | | |
| 200 | 151 | 155 | 8 | 221 | 207 | 117 | 149 | 194 | 3 | 251 | | | | | |
| 78 | 123 | 34 | 242 | 103 | | | | | | | | | | | |
| 218 | 240 | 132 | 99 | 187 | | | | | | | | | | | |

⋮

PRINTING APPARATUS AND PRINTING METHOD

This application claims priority to Japanese Patent Application No. 2008-289676, filed Nov. 12, 2008 and Japanese Patent Application No. 2009-019237, filed Jan. 30, 2009. The entireties of both of the aforementioned applications are incorporated by reference herein.

BACKGROUND

1. Technical Field

The present invention relates to a technique for performing printing on a printing medium.

2. Related Art

In the related art, a serial printing apparatus is known that performs printing on a printing medium by moving a print head relative to the printing medium in a main scanning direction and a sub-scanning direction. The print head has arrays of nozzles that are arranged in the main scanning direction so as to eject ink of each color (see JP-A-2007-145031). For example, when a nozzle array for ejecting yellow ink and a nozzle array for ejecting black ink are arranged in the print head in that order in the main scanning direction, the yellow ink will be ejected earlier than the black ink when seen from the same printing position.

When another ink is ejected at the same printing position, the ink ejected later may bleed depending on the dryness level of the ink ejected earlier. Therefore, if the later-ejected ink is an ink that is easily noticeable because of its lower brightness than the earlier-ejected ink, the bleeding of ink will be more easily noticeable. Moreover, if the earlier-ejected ink mixes well with a later-ejected ink, the later-ejected ink will bleed more easily.

Such a problem becomes particularly prominent in the case of bidirectional printing where ink is ejected for both the forward path and the return path of the print head (see JP-A-2007-145031). Since the bidirectional printing changes the order of the inks ejected, the likelihood of bleeding changes, and thus there is a concern that non-uniform density may occur even when the same color is formed for the forward path and the return path.

SUMMARY

An advantage of some aspects of the invention is that it provides a serial printing apparatus capable of suppressing the occurrence of bleeding resulting from different ink drying times, thus improving image quality.

The invention aims to solve at least a part of the above-described problems and can be actualized as a form or an application as described below.

In a first aspect, a printing apparatus is provided that performs printing on a printing medium by moving a print head relative to the printing medium in a main scanning direction, which is a width direction of the printing medium, and a sub-scanning direction that intersects the main scanning direction. The printing apparatus includes a print head that includes a plurality of nozzles configured to eject ink, an acquisition unit that acquires image data, and a dot forming unit that controls the print head so as to eject the ink to form dots corresponding to the image data on the printing medium. When suppression dots, which are dots formed to suppress bleeding, are formed on the printing medium, the dot forming unit controls the print head so that ink corresponding to the suppression dots is ejected from preceding nozzles arranged to eject ink to the printing medium earlier than other nozzles of the plurality of nozzles. According to such a configuration of the printing apparatus, the suppression dots, which are dots formed to suppress bleeding, can be formed by the preceding nozzles which are arranged to eject ink to the printing medium earlier than other nozzles of the plurality of nozzles. Therefore, the earlier ejection of the suppression dots provides more time for the suppression dots to dry, which may serve to suppress the occurrence of bleeding.

In many embodiments, the print head is configured to eject different inks. For example, the plurality of nozzles can include a first nozzle array arranged in the sub-scanning direction so as to eject a first ink and a second nozzle array arranged in the sub-scanning direction so as to eject a second ink. The second ink can correspond to the suppression dots and can have a higher propensity for producing visible bleeding that the first ink. Each of the first and second nozzle arrays can be arranged in the main scanning direction. Each of the first and second nozzle arrays can comprise a plurality of preceding nozzles and a plurality of following nozzles. The preceding nozzles of the second nozzle array can be arranged on a side where the preceding nozzles of the second array arrive on the printing medium prior to the following nozzles of the second array when the print head is moved in the sub-scanning direction. The dot forming unit can eject the second ink with a higher usage rate of the preceding nozzles of the second array than a usage rate of the preceding nozzles of the first nozzle array that are arranged at positions corresponding to the preceding nozzles of the second array. According to such embodiments of the printing apparatus, the second ink can be ejected earlier than the first ink with respect to the same printing position. Therefore, the second ink is given an increased opportunity to dry before encountering the first ink.

In many embodiments, the dot forming unit determines the forming position of the dots by comparing threshold values of a dither mask having a plurality of threshold values with pixel data constituting an image. The dot forming position of the first ink can be determined using a first dither mask, and the dot forming position of the second ink can be determined using a second dither mask. According to such embodiments, it is possible to eject the first and second inks using two different dither masks.

In many embodiments, the number of elements in the second dither mask is selected based on a nozzle arrangement pattern that occurs repeatedly on the printing medium. For example, a number of elements in the main scanning direction and in the sub-scanning direction of the second dither mask can be respectively integral multiples of a nozzle arrangement pattern that occurs repeatedly on the printing medium when the print head performs a main scan and a sub-scan, respectively, so that the dots are formed on the printing medium by the second nozzle array. According to such embodiments, it is possible to uniquely correlate the positions of the dots formed on the printing medium with the nozzles that form the dots. As a result, the usage rate of each of the nozzles in the second nozzle array can be easily changed using the second dither mask.

In many embodiments, the second dither mask is configured such that the threshold values corresponding to the positions where the dots are formed are set to values where a usage rate of the preceding nozzles of the second array exceeds a usage rate of the following nozzles of the second array.

According to such embodiments, it is possible to increase the usage rate of the preceding nozzles only by appropriately arranging the threshold values. The values corresponding to a higher usage rate are threshold values having smaller values, for example.

In many embodiments, the number of elements in the first dither mask is selected based on a nozzle arrangement pattern that occurs repeatedly on the printing medium. For example, a number of elements in the main scanning direction and in the sub-scanning direction of the first dither mask can be respectively integral multiples of corresponding number of elements of a nozzle arrangement pattern that occurs repeatedly on the printing medium when the print head performs a main scan and a sub-scan, respectively, so that the dots are formed on the printing medium by the first nozzle array. According to such embodiments, the usage rate of each of the nozzles in the first nozzle array can be easily changed using the first dither mask.

In many embodiments, the first dither mask is configured such that the threshold values corresponding to the positions where the dots are formed are set to values where a usage rate of the following nozzles of the first array exceeds a usage rate of the preceding nozzles of the first array.

According to such embodiments, it is possible to decrease the usage rate of the preceding nozzles of the first nozzle array, which can be arranged at positions corresponding to the preceding nozzles of the second array, only by appropriately arranging the threshold values of the first dither mask. The values corresponding to a lower usage rate are threshold values having higher values, for example.

In many embodiments, the number of nozzles of the preceding nozzles in the first array and/or in the second array is set to correspond to an amount of one sub-scan.

According to such embodiments, since the second ink can be ejected to a non-printed area on the printing medium, it is possible to more effectively suppress the occurrence of non-uniform density.

In many embodiments, the printing apparatus further including a dot recording rate conversion unit that converts the acquired image data into a dot recording rate representing density of dots per unit area of the printing medium. The suppression dots can be dots having the converted dot recording rate lower than a predetermined value.

According to such embodiments, it is possible to suppress the bleeding of the dots that are sparsely formed.

In many embodiments, the dot forming unit starts embedding dots within a band corresponding to the width of the print head in the sub-scanning direction by causing the print head to perform several main scans while changing a dot forming position for each main scan. The preceding nozzles can include nozzles among the plurality of nozzles that form dots within the band during a first main scan of the several main scans.

According to embodiments, it is possible to make sure that during the printing of each band, the suppression dots are always formed by the first main scan during the printing of that band. Therefore, it is possible to facilitate the drying of the suppression dots and thus suppress the occurrence of bleeding.

The invention may be embodied in the form of a printing method or a computer program, in addition to the above-described printing apparatus. The computer program may be recorded on a computer-readable recording medium. A variety of media such as flexible disks, CD-ROMs, DVD-ROMs, opto-magnetic disks, memory cards, or hard disks may be used as the recording medium.

BRIEF DESCRIPTION OF THE DRAWINGS

The invention will be described with reference to the accompanying drawings, wherein like numbers reference like elements.

FIG. 7 is a schematic diagram illustrating the positions of dots formed by the preceding nozzle group, in accordance with many embodiments.

FIG. 8 is a schematic diagram illustrating part of a second dither mask in accordance with many embodiments.

FIG. 9 is a schematic diagram illustrating the dot forming positions when a beta image having a dot recording rate of 5% was printed using the second dither mask, in accordance with many embodiments.

FIG. 10 is a schematic diagram illustrating the dot forming positions when a beta image having a dot recording rate of 30% was printed using the second dither mask, in accordance with many embodiments.

FIG. 15 is a schematic diagram illustrating part of a first dither mask in accordance with many embodiments.

FIG. 16 is a schematic diagram illustrating the dot forming positions when a beta image having a dot recording rate of 60% was printed using the first dither mask, in accordance with many embodiments.

FIG. 18 is a schematic diagram illustrating part of a first dither mask in accordance with many embodiments.

FIG. 19 is a schematic diagram illustrating the dot forming positions when a beta image having a dot recording rate of 50% was printed using the first dither mask, in accordance with many embodiments.

FIG. 20 is a schematic diagram illustrating the dots formed by nozzle numbers 0 to 6 when the first dither mask is used, in accordance with many embodiments.

FIG. 21 is a schematic diagram illustrating the dots formed by nozzle numbers 7 to 14 when the first dither mask is used, in accordance with many embodiments.

FIG. 22 is a schematic diagram illustrating the dots formed by nozzle numbers 15 to 22 when the first dither mask is used, in accordance with many embodiments.

FIG. 23 is a schematic diagram illustrating the dots formed by nozzle numbers 23 to 29 when the first dither mask is used, in accordance with many embodiments.

FIG. 24 is a schematic diagram illustrating part of a second dither mask in accordance with many embodiments.

FIG. 25 is a schematic diagram illustrating the dot forming positions when a beta image having a dot recording rate of 50% was printed using the second dither mask, in accordance with many embodiments.

FIG. 26 is a schematic diagram illustrating the dots formed by nozzle numbers 0 to 6 when the second dither mask is used, in accordance with many embodiments.

FIG. 27 is a schematic diagram illustrating the dots formed by nozzle numbers 7 to 14 when the second dither mask is used, in accordance with many embodiments.

FIG. 28 is a schematic diagram illustrating the dots formed by nozzle numbers 15 to 22 when the second dither mask is used, in accordance with many embodiments.

FIG. 29 is a schematic diagram illustrating the dots formed by nozzle numbers 23 to 29 when the second dither mask is used, in accordance with many embodiments.

DESCRIPTION OF EXEMPLARY EMBODIMENTS

Figure 1:
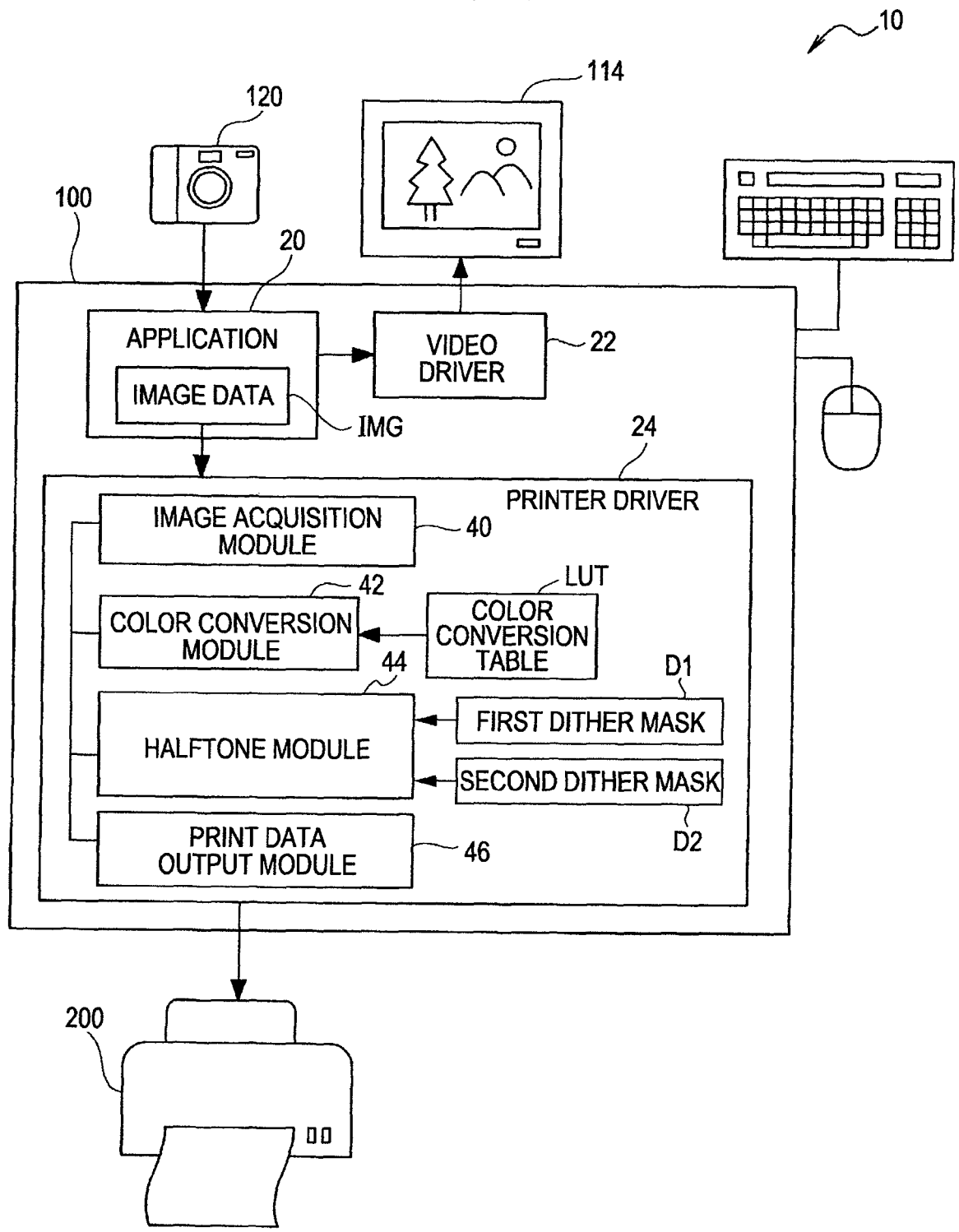
FIG. 1 is a block diagram illustrating a simplified configuration of a printing system in accordance with many embodiments.

Hereinafter, exemplary embodiments of the invention will be described in the following order:
A. First Embodiment;
A-1. Simplified Configuration of Printing System;
A-2. Configurations of Computer and Printer;
A-3. Principle of Bleeding. Suppression;
A-4. Printing Process;
B. Second Embodiment;
C. Third Embodiment;
D. Fourth Embodiment; and
E. Modifications
A. First Embodiment
A-1. Simplified Configuration of Printing System FIG. 1 is a block diagram illustrating a simplified configuration of a printing system 10 according to an embodiment of the invention. As illustrated in the drawing, the printing system 10 of the present embodiment is configured to include a computer 100 and a printer 200 that actually prints images under the control of the computer 100. The printing system 10 functions in its entirety as a printing apparatus in its broad sense.

The computer 100 illustrated in FIG. 1 has installed therein a predetermined operating system, and an application program 20 is running under the operating system. A video driver 22 and a printer driver 24 are incorporated into the operating system. For example, the application program 20 inputs image data (IMG) from a digital camera 120 via a peripheral device interface (I/F) 108. Then, the application program 20 displays an image represented by the image data IMG on a display 114 via the video driver 22. Moreover, the application program 20 outputs the image data IMG to the printer 200 via the printer driver 24. The image data (IMG) that the application program 20 inputs from the digital camera 120 are data composed of the three color components red (R), green (G), and blue (G).

The printer driver 24, which corresponds to "dot forming unit" of this application, includes an image acquisition module 40, a color conversion module 42, a halftone module 44, and a print data output module 46. The image acquisition module 40 is configured to acquire image data that are to be printed from the application program 20.

The color conversion module 42 is configured to convert the color components red (R), green (G), and blue (B) of the image data into color components (cyan (C), magenta (M), yellow (Y), and black (K)) that the printer 200 can express, by referring to a color conversion table (LUT) prepared in advance.

The halftone module 44 is configured to perform a halftone process so that the image data having been subjected to a color conversion are expressed by a distribution of dots having two values (specifically, multiple values). In the present embodiment, a well-known organized dither method is used as the halftone process.

The print data output module 46 is configured to rearrange the data representing the dot arrangement of each color obtained by the halftone process so as to comply with the forming order of dots by a print head 241 of the printer 200 and output the rearranged data to the printer 200 as print data.

For dots that are formed by a low-visibility ink for which bleeding is rarely noticeable, the halftone module 44 of the present embodiment performs the halftone process using a general dither mask with blue noise characteristics (this mask will be referred to as "first dither mask D1"). In contrast, for dots that are formed by a high-visibility ink for which bleeding is easily noticeable, the halftone module 44 uses a special dither mask (hereinafter referred to as "second dither mask D2") so as to suppress the occurrence of bleeding on a printing medium. The principle of suppressing the bleeding by the use of a special dither mask will be described later in detail.

The expressions, "low visibility" and "high visibility", are not used for representing the absolute properties of the ink but for representing the relative properties of the ink. For example, when two types of ink are printed on a printing medium, ink having a relatively low brightness will be "high-visibility ink" whereas ink having a relatively high brightness will be "low-visibility ink". Specifically, when cyan ink and yellow ink are compared, cyan ink will be "high-visibility ink" whereas yellow ink will be "low-visibility ink". Moreover, when black ink and cyan ink are compared, black ink will be "high-visibility ink" whereas cyan ink will be "low-visibility ink". Thus, according to the relative expressions, "low visibility" and "high visibility", the position of cyan ink will be reversed depending on the ink used for comparison. However, in the present embodiment, in order to classify the types of inks used in the printer 200, black ink and magenta ink will be treated as high-visibility ink whereas cyan ink and yellow ink will be treated as low-visibility ink, for convenience's sake.

A-2. Configurations of Computer and Printer

Figure 2:
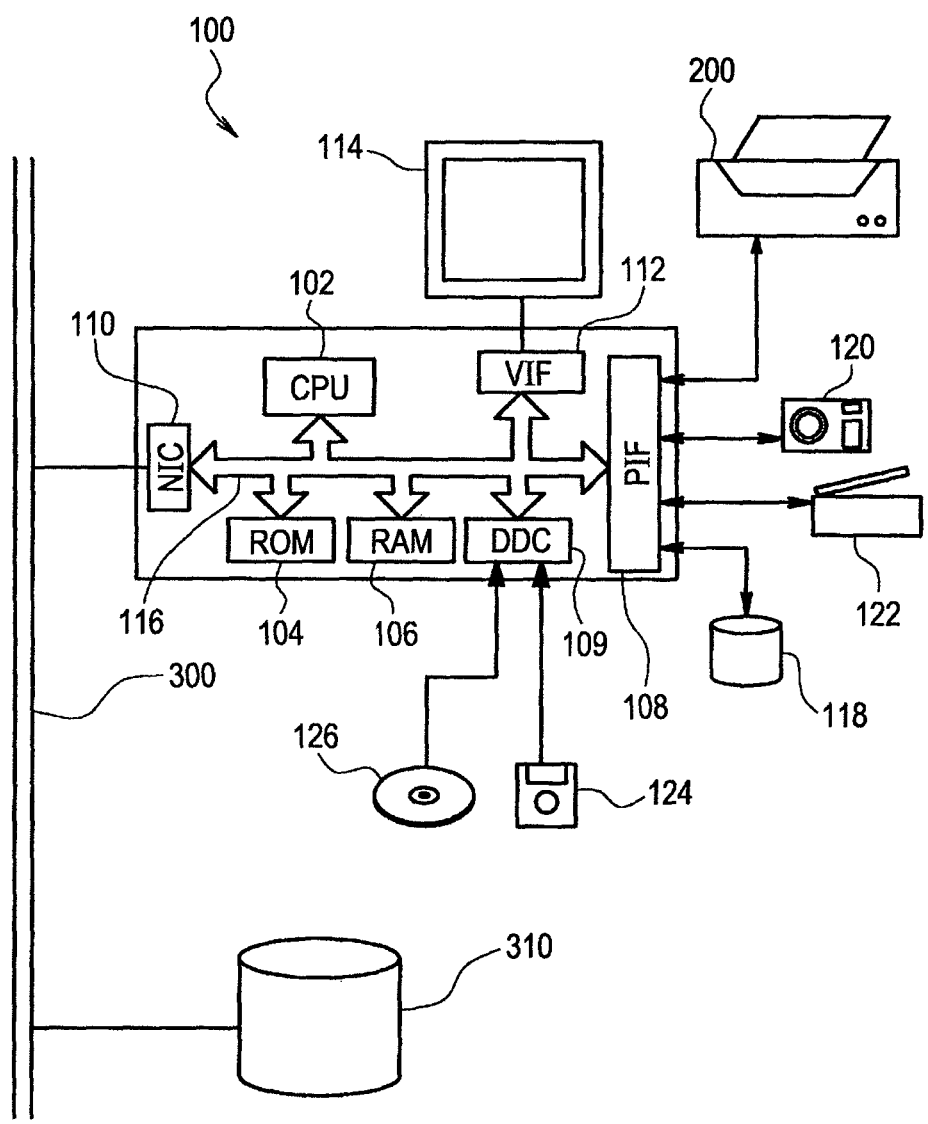
FIG. 2 is a block diagram illustrating a simplified configuration of a computer in accordance with many embodiments.

FIG. 2 is a block diagram illustrating a simplified configuration of the computer 100, in accordance with many embodiments. The computer 100 is a general purpose computer having a configuration in which a read only memory (ROM) 104, a random access memory (RAM) 106, and the like are connected to a central processing unit (CPU) 102 via a bus 116.

In the computer 100, a disk controller 109 for reading data from a flexible disk 124, a compact disk 126, or the like, a peripheral device I/F 108 for transmitting/receiving data to/from a peripheral device, and a video I/F 112 for driving the display 114 are connected to each other. The peripheral device I/F 108 is connected to a printer 200 and a hard disk 118. Moreover, when the digital camera 120 or a color scanner 122 is connected to the peripheral device I/F 108, it is possible to process images acquired from the digital camera 120 or the color scanner 122. Furthermore, when a network interface card 110 is installed therein, the computer 100 may be able to be connected to a communication line and acquire the data stored in a storage device 310 connected to the communication line 300. Upon acquisition of the image data to be printed, the computer 100 controls the printer 200 to perform printing of the image data with the aid of the function of the printer driver 24.

Figure 3:
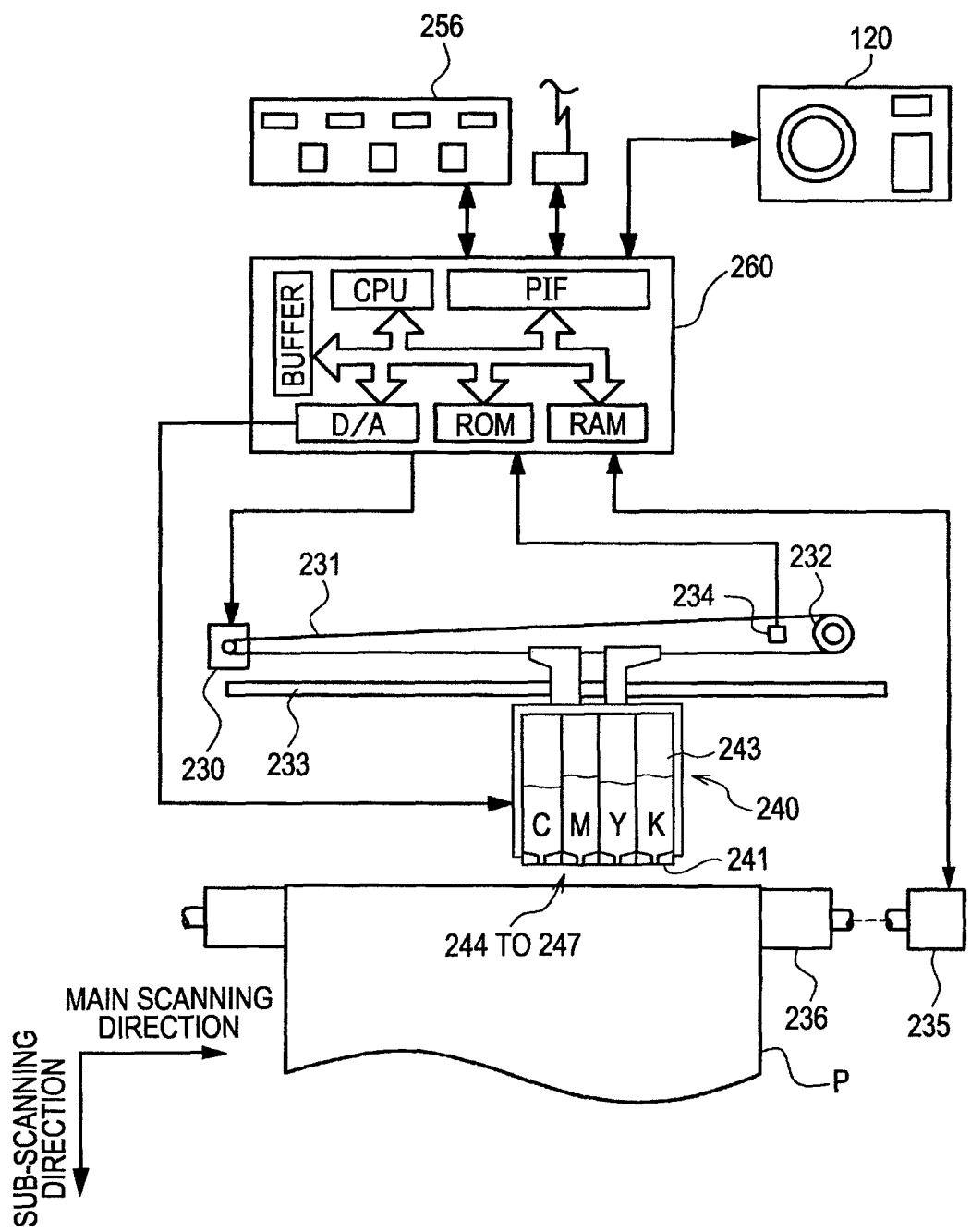
FIG. 3 is a block diagram illustrating a simplified configuration of a printer in accordance with many embodiments.

Next, the configuration of the printer 200 will be described with reference to FIG. 3. As illustrated in FIG. 3, the printer 200 is configured to include a transport mechanism that transports a printing medium P by driving a sheet feeding motor 235, a main scanning mechanism that reciprocates a carriage 240 in the axial direction of a platen 236 by driving a carriage motor 230, a mechanism that drives a print head 241 mounted on the carriage 240 to eject ink and form dots, and a control circuit 260 that exchanges signals with the sheet feeding motor 235, the carriage motor 230, the print head 241, and an operation panel 256.

The main scanning mechanism that reciprocates the carriage 240 in the axial direction of the platen 236 is configured to include a sliding shaft 233 that extends in parallel to the axis of the platen 236 so as to slidably hold the carriage 240, a pulley 232 that stretches an endless drive belt 231 in collaboration with the carriage motor 230, and a position detection sensor 234 that detects the origin position of the carriage 240.

The carriage 240 has mounted thereon an ink cartridge 243 containing therein cyan ink (C), magenta ink (M), yellow ink (Y), and black ink (K). On the print head 241 provided on the lower portion of the carriage 240, arrays of nozzles 244 to 247 that eject ink are formed for each color. The nozzles are able to form a plurality of types of dots with different sizes by ejecting a plurality of types (large, medium, and small) of ink droplets of different quantities of ink. Specifically, the medium dots are formed with about ½ of the ink quantity used for the large dots, and the small dots are formed with about ¼ of the ink quantity used for the large dots.

Figure 4:
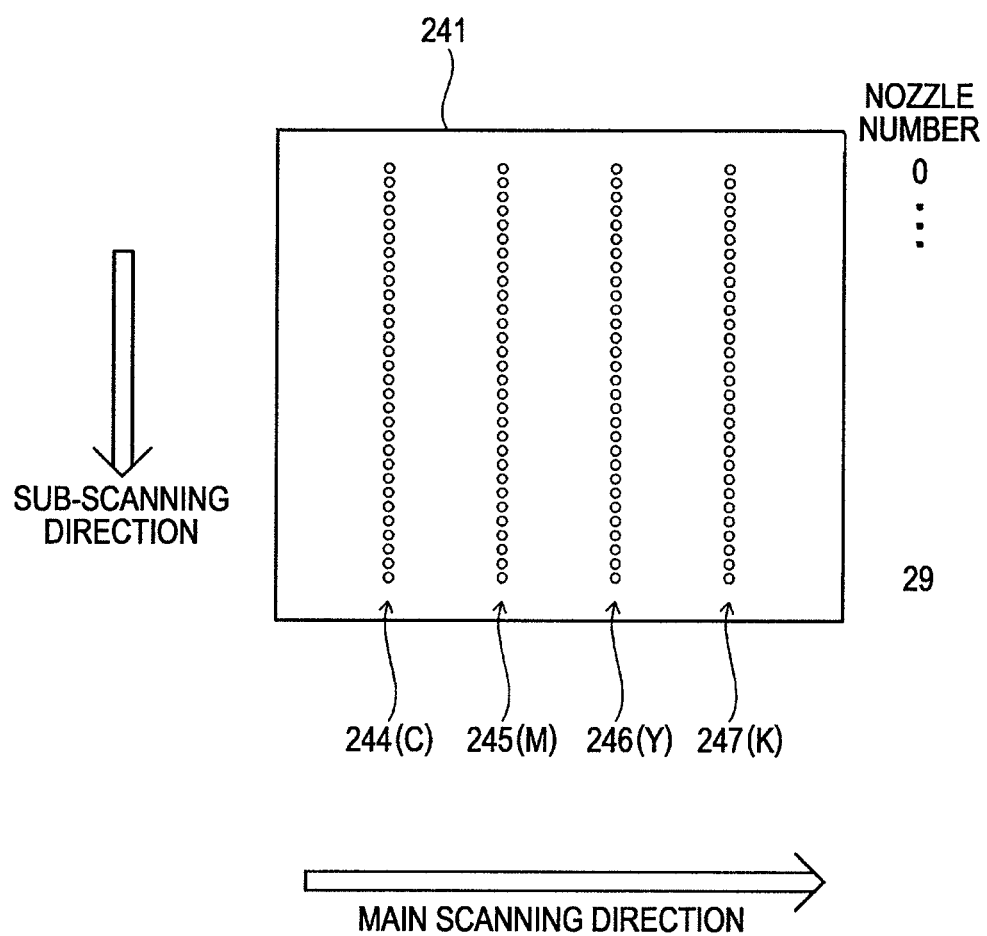
FIG. 4 is a schematic diagram illustrating an arrangement of nozzle arrays formed on a bottom surface of a print head, in accordance with many embodiments.

FIG. 4 is a schematic diagram illustrating an arrangement of the nozzle arrays formed on a bottom surface of the print head 241, in accordance with many embodiments. As illustrated in the drawing, the print head 241 has formed thereon the nozzle arrays 244 to 247, each of which includes a plurality of nozzles arranged in the sub-scanning direction. In the present embodiment, each nozzle array is composed of 30 nozzles. The nozzle arrays 244 to 247 are supplied with ink from the ink cartridge 243 mounted on the carriage 240 to eject cyan ink (C), magenta ink (M), yellow ink (Y), and black ink (K), respectively. The nozzle at the forward end in the sub-scanning direction is numbered "29" and the nozzle at the backward end is numbered "0". As illustrated in FIG. 4, the nozzle array corresponding to each ink color is composed of nozzles that are arranged in one row in the sub-scanning direction. However, other nozzle arrangements can be used. For example, the nozzles of a nozzle array corresponding to one ink color can be arranged in a plurality of rows and/or can be arranged in a zigzag form.

As illustrated in FIG. 3, a control circuit 260 of the printer 200 is configured to include a CPU, a ROM, a RAM, a peripheral device I/F (PIF), and the like that are connected to each other via a bus. The control circuit 260 is configured to drive the carriage motor 230 upon receiving the print data output from the computer 100 via the PIF to reciprocate the print head 241 in the main scanning direction with respect to the printing medium P, and to drive the sheet feeding motor 235 to move the printing medium P in the sub-scanning direction. Moreover, the control circuit 260 drives nozzles at appropriate times based on the print data in conformity with the reciprocating motion (a main scan) of the carriage 240 and the sheet feeding motion (a sub-scan) of the printing medium, whereby dots of ink of appropriate colors are formed at appropriate positions on the printing medium P. In this way, the printer 200 is able to print color images on the printing medium P. Although the printing medium is transported in the sub-scanning direction in the present embodiment, the carriage 240 can be transported in the sub-scanning direction rather than the printing medium.

A-3. Principle of Bleeding Suppression

As described above, the printing system 10 of the present embodiment has a function of suppressing the high-visibility ink from bleeding on the printing medium. To realize such a function, the printing system 10 controls a nozzle usage rate of the nozzle array ejecting the high-visibility ink, such that the usage rate of the nozzles located closer to the forward end in the sub-scanning direction is higher than that of nozzles located closer to the backward end. A nozzle group located closer to the forward end where the usage rate is increased will be referred to as a "preceding nozzle group". On the other hand, a nozzle group located closer to the backward end where the usage rate is relatively decreased will be referred to as a "following nozzle group". In the present embodiment, the number of nozzles where the usage rate is increased corresponds to the number (in this embodiment, 7) of nozzles included in a band width, which is the amount of displacement of the print head 241 relative to the printing medium (P) caused by one sub-scan.

Figure 5:
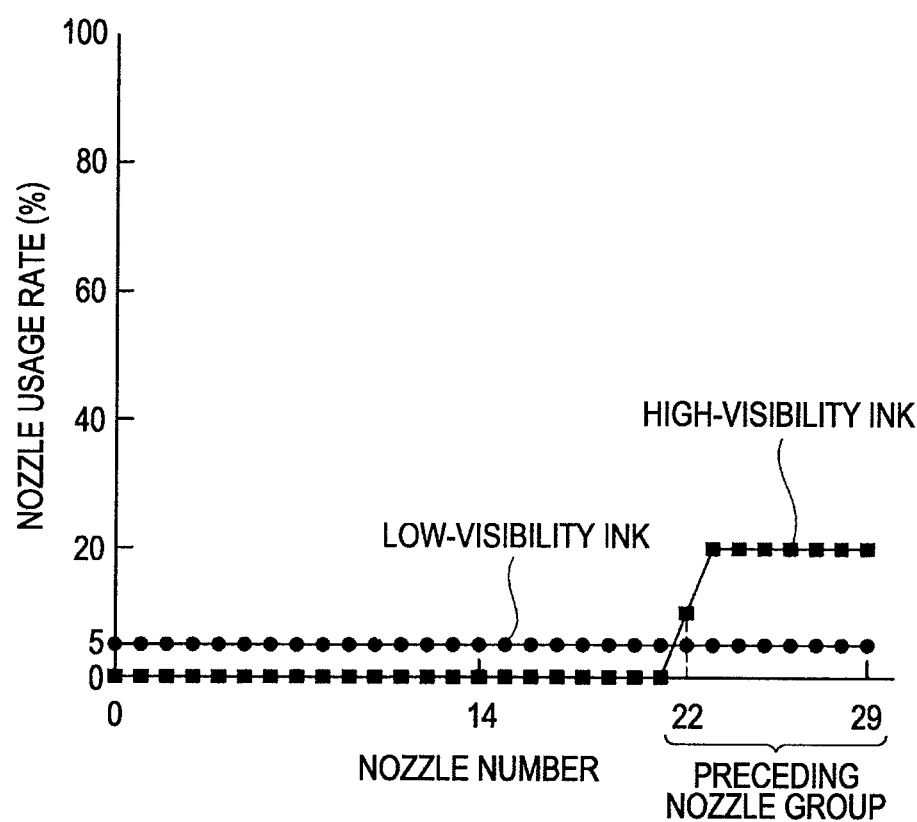
FIG. 5 is a graph illustrating an increased usage rate of a preceding nozzle group, in accordance with many embodiments.

FIG. 5 is a graph illustrating the idea of increasing the usage rate of a preceding nozzle group. In the graph, the horizontal axis represents the number (0 to 29) of the nozzles constituting the nozzle array, and the vertical axis represents the usage rate of each nozzle. FIG. 5 illustrates the nozzle usage rate of the low-visibility ink and the nozzle usage rate of the high-visibility ink when the dot recording rate for a predetermined print area is 5%.

For example, as illustrated in FIG. 5, in the present embodiment, as for the low-visibility ink, all the nozzles eject ink with the same nozzle usage rate (5%). In contrast, as for the high-visibility ink, the nozzle usage rate of the preceding nozzle group (nozzle numbers 22 to 29) is increased to about 20%, and the nozzle usage rate of the following nozzle group (nozzle numbers 0 to 21) is decreased to approximately 0%, so that the ink is ejected with an average nozzle usage rate of 5% for the whole nozzle array.

In the present embodiment, as described above, the usage rate of the preceding nozzle group is increased by changing the usage rate of each nozzle in the nozzle array. By doing so, the print head 241 is able to eject the high-visibility ink earlier than the low-visibility ink with respect to the same printing position. As a result, it is possible to facilitate the drying of the high-visibility ink and suppress bleeding of the high-visibility ink. In FIG. 5, only the nozzle number 22 has an intermediate usage rate compared to those of the preceding nozzle group and the other nozzles. This is to prevent occurrence of a stripe pattern at an intermediate position of adjacent bands at which dots are formed by the nozzle numbered 22 (see FIG. 7).

In the present embodiment, in order to change the usage rate of the nozzles constituting the nozzle array as illustrated in FIG. 5, a special dither mask (second dither mask D2) is used at the time of performing a halftone process on a color corresponding to the high-visibility ink. The principle of changing the usage rate of each nozzle by the use of the second dither mask D2 will be described below.

In the present embodiment, it will be assumed that the print head 241 uses the following drive control parameters: an overlap number of "2", a nozzle pitch of "2", and a sheet feeding amount of "15", thereby performing bidirectional printing where ink is ejected for both the forward path and the return path of the print head. The overlap number refers to the number of main scans necessary for embedding one line of dots in the main scanning direction (horizontal direction). That is to say, when the overlap number is "2", two main scans will form one line of dots in the main scanning direction. The nozzle pitch refers to the pitch between two neighboring nozzles formed in a nozzle array. In the present embodiment, since the nozzle pitch is "2", one main scan of the print head 241 will form one line of dots in an alternate manner. The sheet feeding amount refers to an amount of displacement (number of lines) of the print head 241 transported in the sub-scanning direction by one main scan. In the present embodiment, the sheet feeding amount is set to "15". The sheet feeding amount is sometimes referred to as "band width". In the present embodiment, the width of the preceding nozzle group (=8 [number of nozzles]×2 [nozzle pitch]−1) is set to be identical to the band width.

Figure 6:
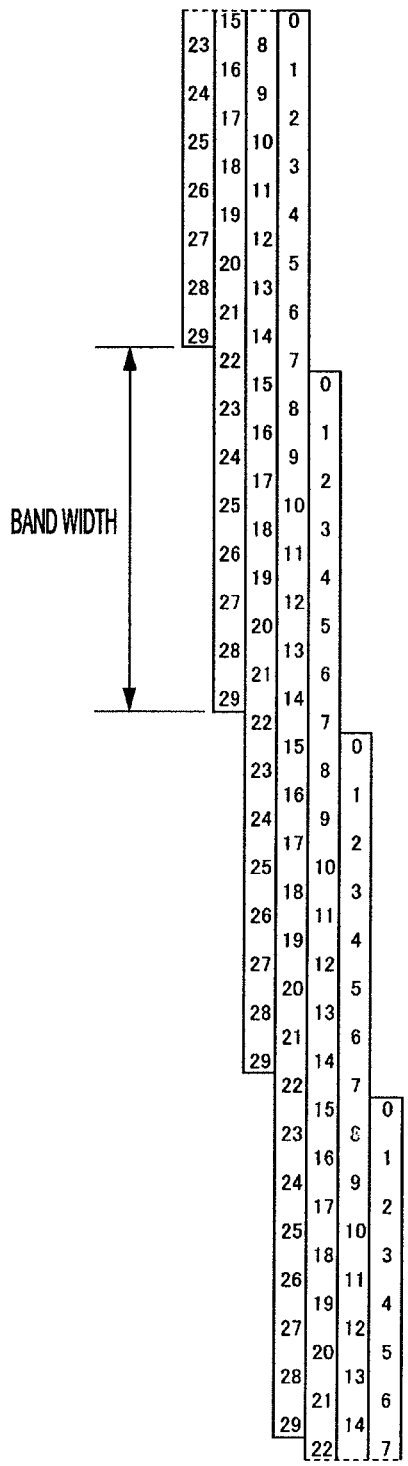
FIGS. 6A to 6C are schematic diagrams illustrating the state where dots are formed on a printing medium, in accordance with many embodiments.

FIGS. 6A to 6C are schematic diagrams illustrating the state where dots are formed on a printing medium. FIG. 6A illustrates a state where a nozzle array composed of 30 nozzles (nozzle numbers 0 to 29) is sub-scanned (sheet-fed) by 15 dots for each main scan. FIG. 6B illustrates the order of forming dots in a predetermined local 2×2 area on the printing medium. As illustrated in the drawing, in the present embodiment, dots are embedded within the local area in order from top left, bottom right, top right, and bottom left. This order is referred to as an "embedding order". The local area is configured such that a horizontal size thereof (in the main scanning direction) is identical to the overlap number (in the present embodiment, "2"), and a vertical size thereof (in sub-scanning direction) is identical to the nozzle pitch (in the present embodiment, "2"). The embedding order changes with every sub-scan of the print head 241, and therefore, in the present embodiment, the embedding order returns to its original embedding order after the embedding order is changed four times. The unit of repetition of the embedding order corresponds to the product of the nozzle pitch and the overlap number. The embedding order is set in accordance with a predetermined command that the printer driver 24 sends to the control circuit 260 of the printer 200. Upon receiving the settings on the embedding order from the printer driver 24, the control circuit 260 starts forming dots in accordance with the set embedding order.

FIG. 6C illustrates a state where dots are formed on the printing medium in accordance with the drive control parameters and the embedding order described above. Each grid illustrated in FIG. 6C represents one dot, and the number inscribed in the grid represents the number of the nozzle forming that dot. In the present embodiment, 8 main scans (4 forward-path main scans and 4 backward-path main scans) and 8 sub-scans are performed as illustrated in FIG. 6A, whereby a range of print areas of 2×60 dots is embedded with dots as illustrated in FIG. 6C. This pattern of 2×60 dots (hereinafter referred to as a "nozzle arrangement pattern") is repeatedly applied in the main scanning direction and the sub-scanning direction whereby dots are formed on the whole printing medium. That is to say, when printing is performed with the drive control parameters and the embedding order described above, the forming positions of the dots formed on the printing medium are uniquely correlated with the number of the nozzles forming the dots, as illustrated in FIG. 6C. In such a case, if dots located at positions corresponding to nozzle numbers 22 to 29 in FIG. 6C are such dots that are easily formed by a halftone process, the usage rate of the preceding nozzle group will be increased. With such easily formed dots, it is likely that in an organized dither method, the threshold values corresponding to such positions are low. For this reason, in the present embodiment, a dither mask having a size corresponding to the nozzle arrangement pattern illustrated in FIG. 6C is prepared as the second dither mask D2, and an arrangement of threshold values used for the second dither mask D2 is optimized to adjust the usage rate of each nozzle.

Figure 7:
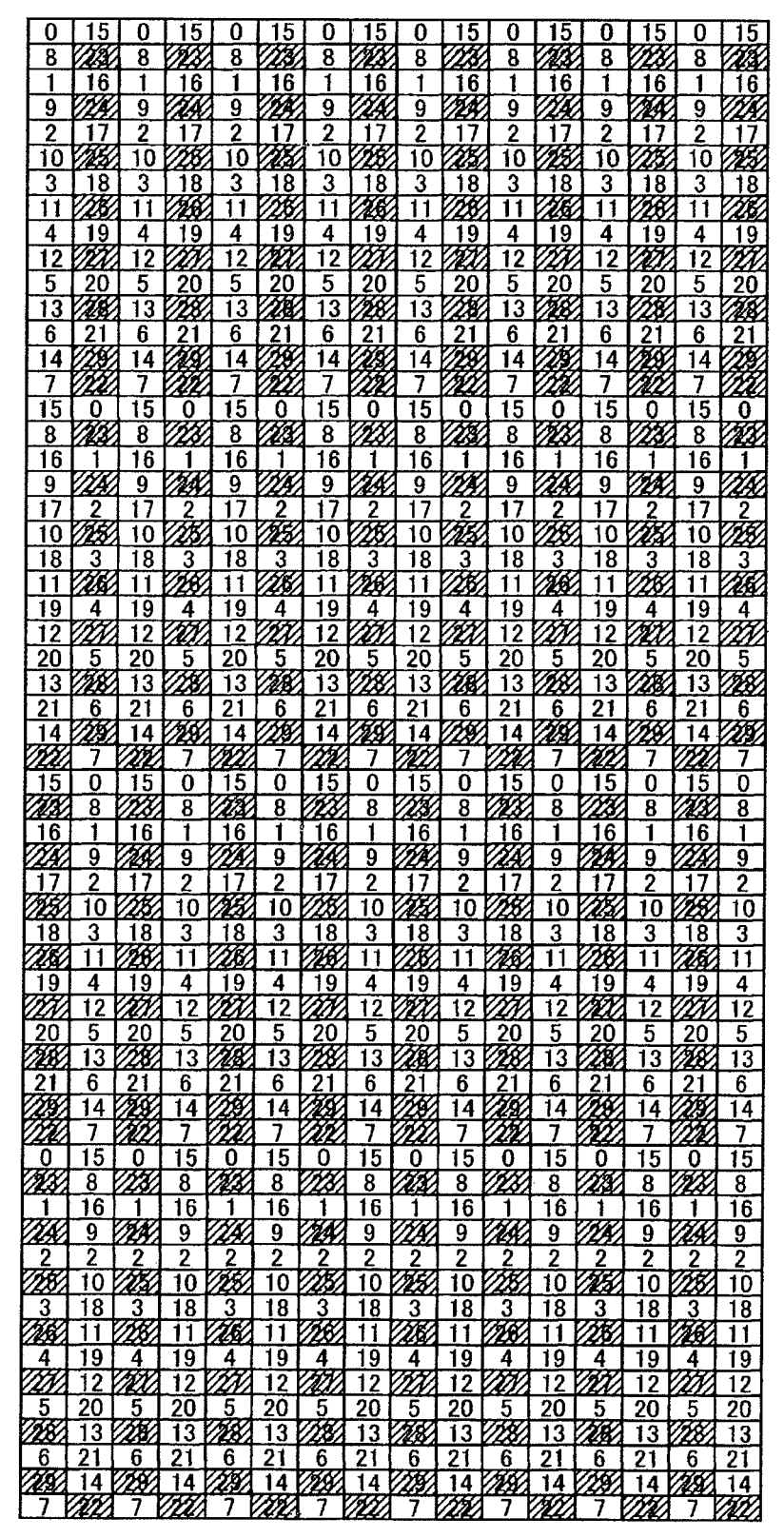

FIG. 7 is a schematic diagram illustrating the positions of dots formed by the preceding nozzle group. FIG. 7 illustrates a state where 8 nozzle arrangement patterns illustrated in FIG. 6C are connected together in the main scanning direction. In the drawing, hatched portions are positions where dots are formed by the preceding nozzle group (nozzle numbers 22 to 29) illustrated in FIG. 5. As described above, in the present embodiment, the usage rate of the preceding nozzle group is increased to be higher than that of the following nozzle group, thus suppressing bleeding of the high-visibility ink. Therefore, by using a dither mask in which threshold values (namely, lower threshold values) where the dots are easily formed at the hatched positions in FIG. 7, it is possible to increase the usage rate of the nozzles of the preceding nozzle group to be higher than that of the other nozzles.

Figure 8:
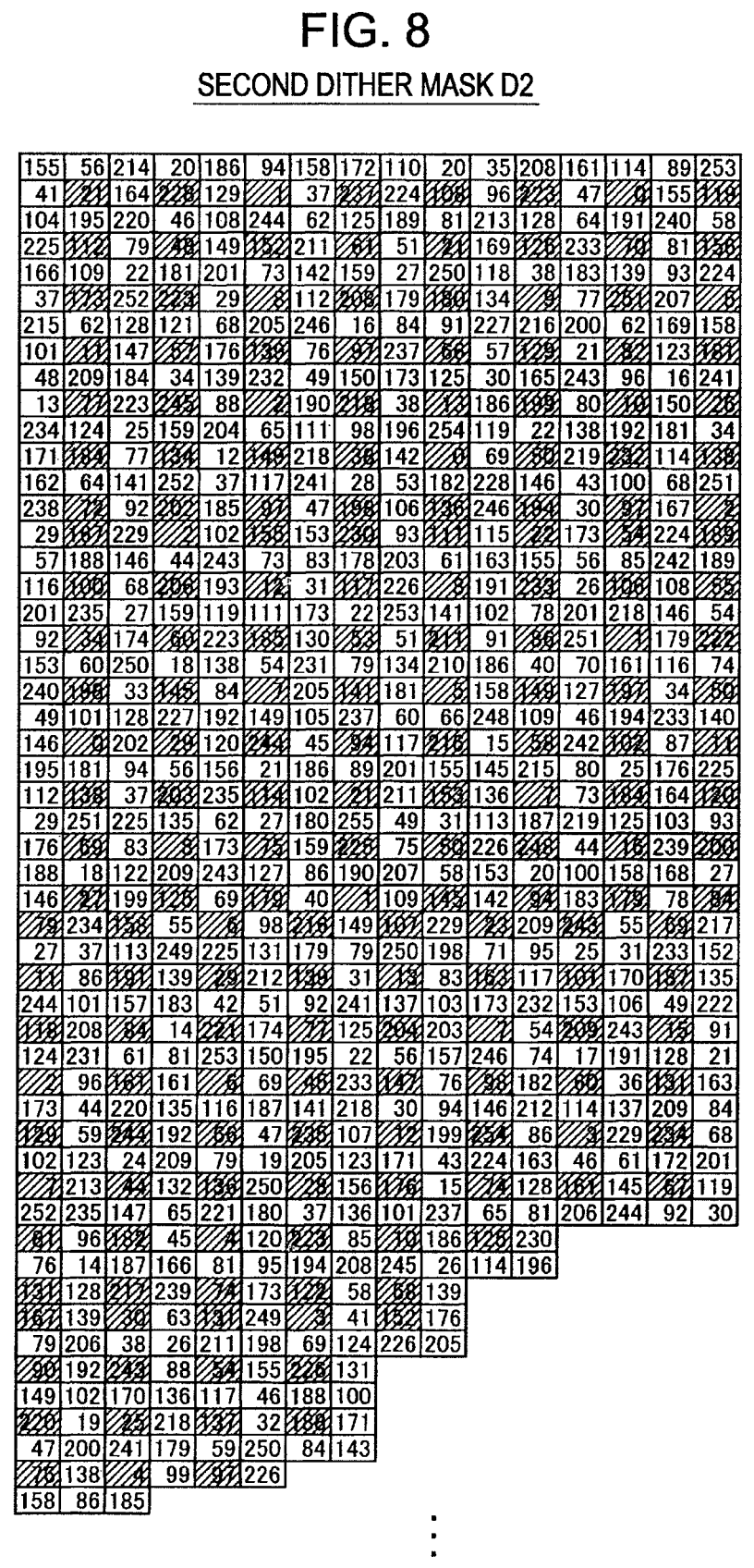

FIG. 8 is a schematic diagram illustrating part of the second dither mask D2 produced based on the above-mentioned idea. The second dither mask D2 has a size of 16×60, in which the size in the main scanning direction is 8 times larger than the size of the nozzle arrangement pattern illustrated in FIG. 6C, whereas the size in the sub-scanning direction is the same. That is to say, the second dither mask D2 has 960(=16×60) elements. In the second dither mask D2, one of threshold values of 0 to 255 is assigned to each element while permitting redundant values. Similar to FIG. 7, hatched portions in FIG. 8 are elements where dots are formed by the preceding nozzle group (nozzle numbers 22 to 29). Threshold values can be assigned to each element as follows. First, lower threshold values are evenly assigned to elements corresponding to the nozzle numbers 22 to 29. Thereafter, remaining threshold values are assigned to the other elements. Finally, with respect to all nozzle numbers, the assigned threshold values are rearranged to achieve an overall balance. As a method of evenly assigning the threshold values, a method can be used in which a predetermined granularity measure (such as, RMS granularity, autocorrelation function, or Wiener spectrum) is calculated before and after threshold values are assigned so that the assigned threshold values yield the optimum change in granularity measures.

Figure 9:
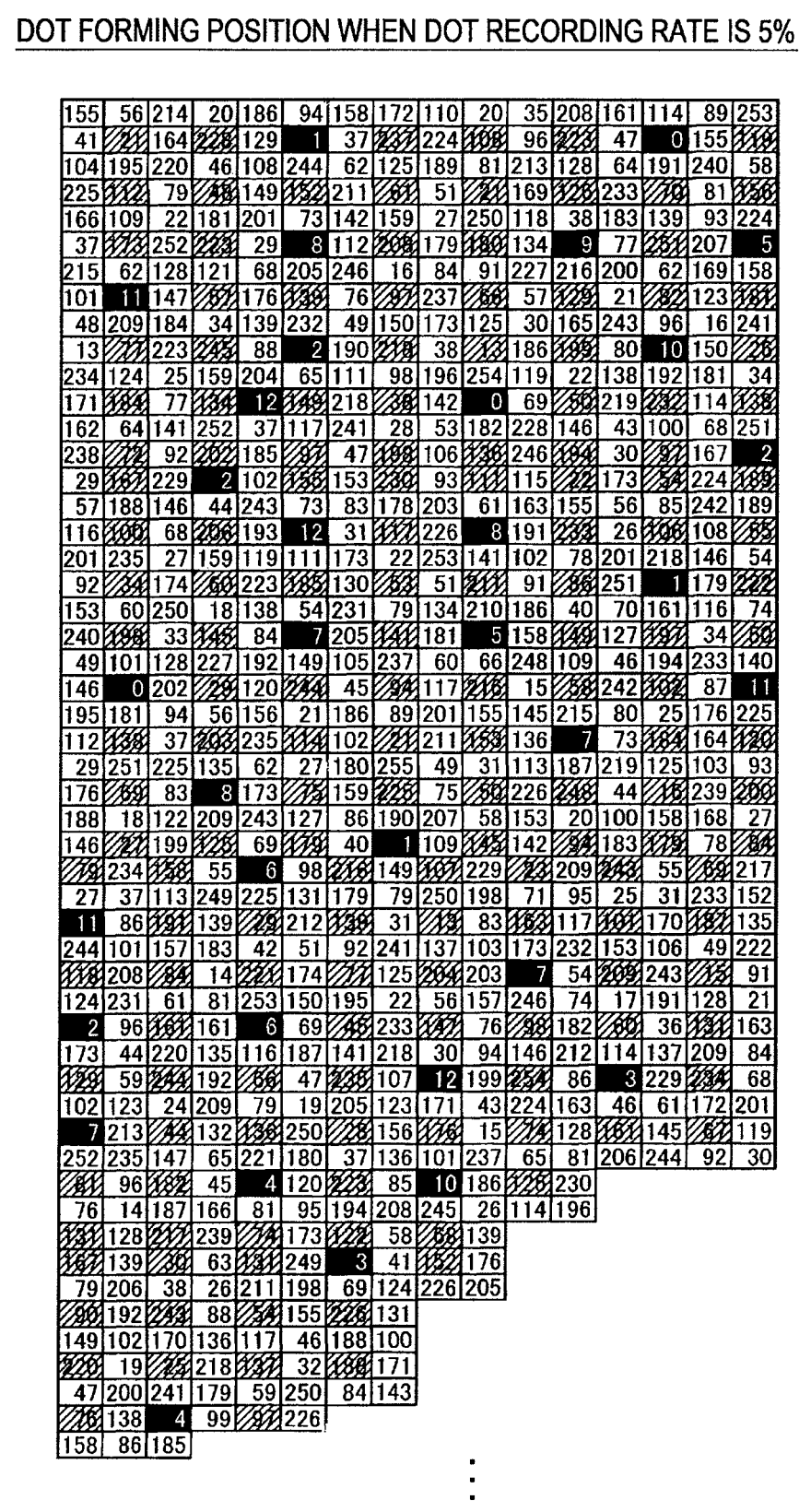

FIG. 9 is a schematic diagram illustrating the dot forming positions when a beta image having a dot recording rate of 5% was printed using the second dither mask D2 illustrated in FIG. 8. In the drawing, black-painted portions indicate positions where dots are formed. As illustrated in FIG. 9, when the second dither mask D2 illustrated in FIG. 8 is used and the dot recording rate is 5%, dots are formed only in the hatched portion in FIG. 8, namely the positions corresponding to the preceding nozzle group (nozzle numbers 22 to 29). Therefore, if the dot recording rate is at least 5%, the entire dots can be formed by the preceding nozzle group.

Figure 10:
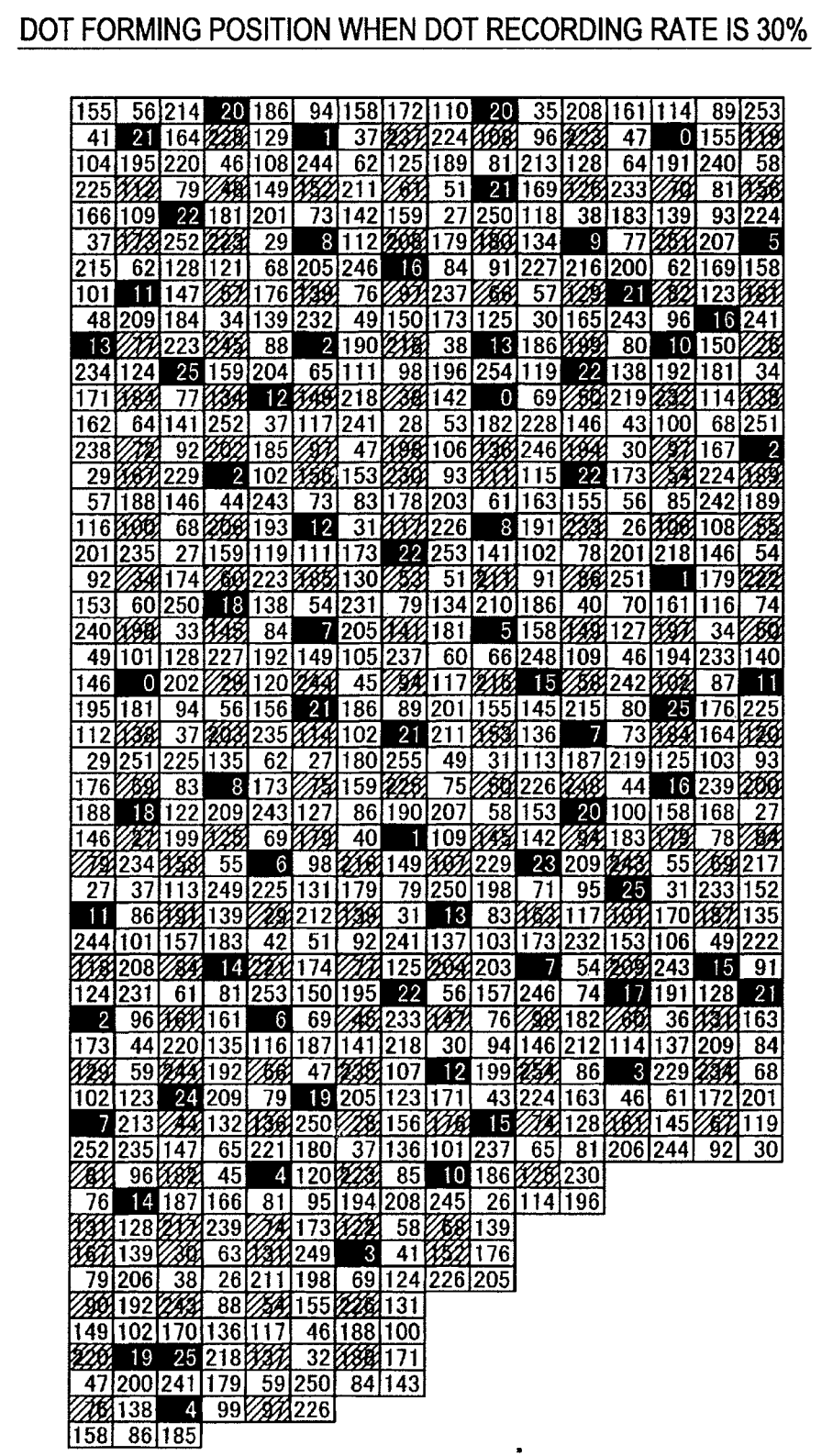

FIG. 10 is a schematic diagram illustrating the dot forming positions when a beta image having a dot recording rate of 30% was printed using the second dither mask D2. As illustrated in FIG. 10, when the second dither mask D2 illustrated in FIG. 8 is used and the dot recording rate is 30%, dots are also formed by nozzles other than those of the preceding nozzle group.

The computer 100 has stored therein, the second dither mask D2 and a first general dither mask D1 with blue noise characteristics and performs a halftone process using one of these dither masks depending on a color to be processed. A printing process for performing printing using these dither masks will be described in detail below.

A-4. Printing Process

Figure 11:
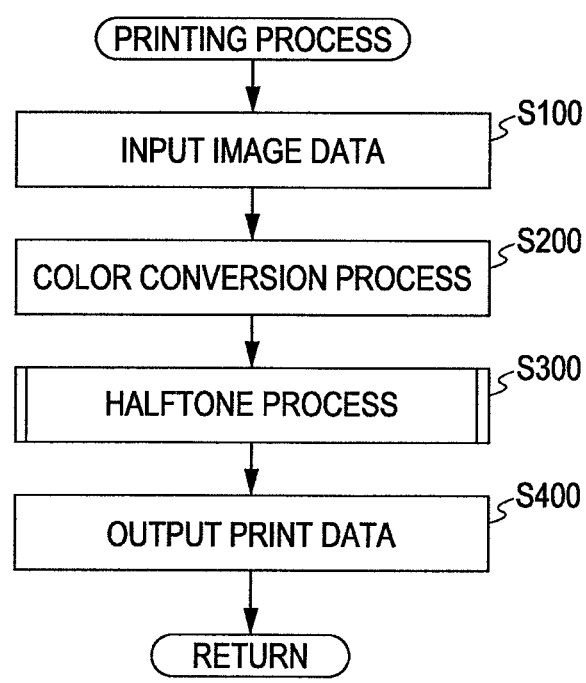
FIG. 11 is a flowchart of a printing process in accordance with many embodiments.

FIG. 11 is a flowchart of a printing process executed by the computer 100, in accordance with many embodiments. The printing process is executed when the CPU 102 executes a program that is prepared as the printer driver 24. When the printing process is started, the computer 100 receives image data in RGB format from the application program 20 (step S100).

Upon receiving the image data, the computer 100 converts the image data in RGB format received in step S100 into image data in CMYK format with the aid of the color conversion module 42 (step S200).

Upon acquiring the image data in CMYK format, the computer 100 performs a halftone process for each color of cyan (C), magenta (M), yellow (Y), and black (K) with the aid of the halftone module 44, thus producing data that can be transmitted to the printer 200 (step S300). The data transmitted to the printer 200 can include data (dot data) representing the size of an ink droplet that the printer 200 forms on the printing medium P (e.g., the data representing whether a small dot, a medium dot, or a large dot will be formed or not).

When the halftone process is complete, the computer 100 outputs the dot data of each color of C, M, Y, and K produced by the halftone process to the printer 200 as print data with the aid of the print data output module 46 (step S400).

The printer 200 receives the print data output from the computer 100 and prints images on the printing medium by ejecting ink in accordance with the received print data. In the present embodiment, the printer 200 performs bidirectional printing wherein a overlap number is "2", a nozzle pitch is "2", and a sheet feeding amount is "15" and controls the printing mechanisms such as the print head 241, the carriage motor 230, the sheet feeding motor 235, and the like.

Among the above-described steps of the printing process, the detailed description of the halftone process executed in step S300 will be provided below.

Figure 12:
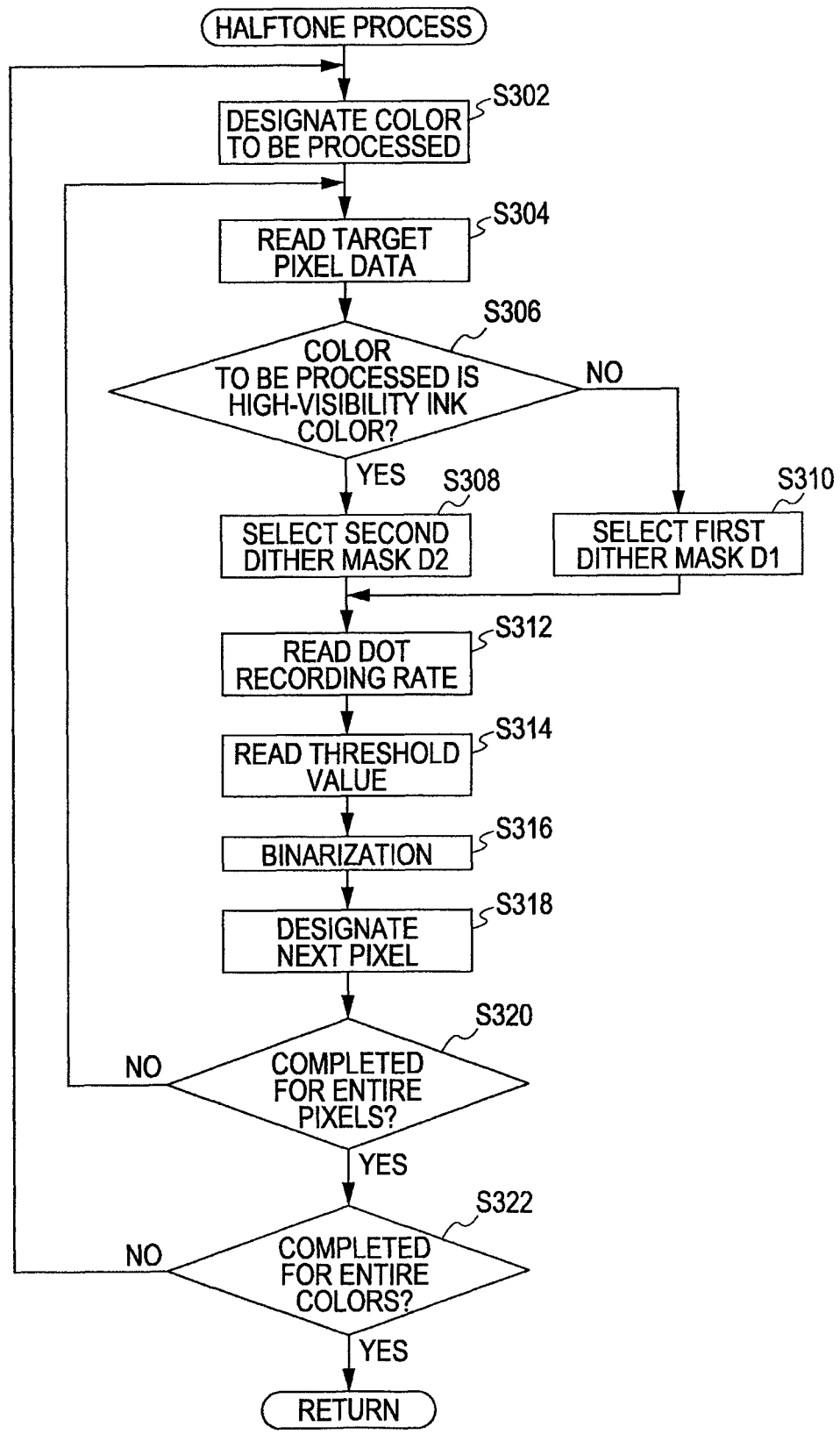
FIG. 12 is a flowchart illustrating a halftone process routine in accordance with many embodiments.

FIG. 12 is a flowchart illustrating a halftone process routine, in accordance with many embodiments. The halftone process is a process that is performed for each color of C, M, Y, and K. As illustrated in the drawing, first, the computer 100 designates one color to be processed from C, M, Y, and K (step S302) and then reads gradation data of a target pixel (step S304). The initial position of the target pixel is located at the top left corner of the image data.

Upon reading the gradation data of the target pixel, the computer 100 determines whether or not the color being processed is a high-visibility ink color (e.g., magenta or black) (step S306). If the color being processed is a high-visibility ink, then the computer 100 selects the second dither mask D2 as a dither mask to be used for a later-described binarization process to suppress bleeding (step S308). In contrast, if the color being processed is a low-visibility ink color (e.g., cyan or yellow), then the computer 100 selects the first dither mask D1 (step S310).

When the dither mask to be used is selected in step S308 or S310, the computer 100 subsequently acquires a dot recording rate corresponding to the gradation data read in step S304 by referring to a dot recording rate table DT (step S312). The dot recording rate refers to a dot density per unit area of a printing medium. The dot recording rate table DT is a table defining the occurrence rate of each of small, medium, and large dots that are caused to occur to the target pixel in accordance with the gradation data of the target pixel.

Figure 13:
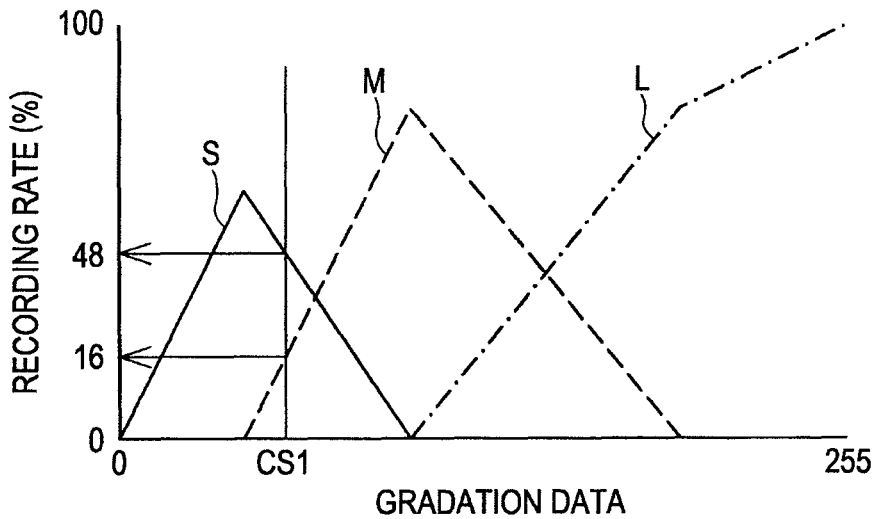
FIG. 13 is a graph illustrating an example of a dot recording rate table in accordance with many embodiments.

FIG. 13 is a graph illustrating an example of a dot recording rate table DT. As illustrated in FIG. 13, the dot recording rate table DT defines the forming rate of large, medium, and small dots. Specifically, in the dot recording rate table DT, the recording rate (S) of small dots is set such that it shows a gradual increase for the gradation data in a range of 0 to 40, where the recording rate reaches its maximum. The recording rate (S) then shows a gradual decrease for the gradation data in a range of 40 to 100, where the recording rate (S) becomes 0. The recording rate (M) of medium dots is set such that it shows a gradual increase for the gradation data in a range of 40 to 100, where the recording rate (M) reaches its maximum. The recording rate (M) then shows a gradual decrease for gradation data in a range of 100 to 200, where the recording rate (M) becomes 0. The recording rate (L) of large dots is set such that it shows a gradual increase for image data in a range of 100 to 255, where the recording rate (L) reaches its maximum (specifically, the rate of gradual increase of the recording rate (L) for gradation data of 200 or higher becomes lower than that for gradation data lower than 200).

Upon acquiring the dot recording rate in step S312, the computer 100 reads a threshold value corresponding to the position of the target pixel from the dither mask (the first dither mask D1 or the second dither mask D2) selected in step S308 or S310 (step S314). Upon reading the threshold value, the computer 100 performs binarization according to an organized dither method using the threshold value and the dot recording rate acquired in step S312 (step S316). The organized dither method is a well-known technique and thus will not be described in detail. In short, the organized dither method is a technique that compares the dot recording rate corresponding to the gradation data of the target pixel with the threshold value of the dither mask corresponding to the position of the target pixel and determines that the dots are formed for that pixel if the dot recording rate is larger, whereas the dots are not formed if the dot recording rate is smaller. In the present embodiment, the dot recording rate has a value of 0 to 100, and the threshold value has a value of 0 to 255. Therefore, the binarization process in step S316 multiplies the dot recording rate acquired in step S312 with 2.55 and compares the multiplication results with the threshold values.

Referring to the dot recording rate table DT illustrated in FIG. 13, there are cases where the recording rates of two or more types of dots are read for one gradation data. For example, for the gradation data CS1, two recording rates, namely "48" for the recording rate S of small dots and "16" for the recording rate (M) of medium dots, are read from the dot recording rate table DT of FIG. 13. In such a case, the computer 100 determines the size of dots to be formed for the target pixel by the following procedure.

(1) First, the recording rate (L) of large dots is compared with the threshold value. When the recording rate (L) of large dots is larger than the threshold value, it is determined that large dots should be formed for the target pixel.

(2) When the recording rate (L) of large dots is smaller than the threshold value, the sum (L+M) of the recording rate (L) of large dots and the recording rate (M) of medium dots is compared with the threshold value. When the sum (L+M) is larger than the threshold value, it is determined that medium dots should be formed for the target pixel.

(3) When the sum (L+M) is smaller than the threshold value, the sum (L+M+S) of the recording rate (L) of large dots, the recording rate (M) of medium dots, and the recording rate (S) of small dots is compared with the threshold value. When the sum (L+M+S) is larger than the threshold value, it is determined that small dots should be formed for the target pixel. On the other hand, when the sum (L+M+S) is smaller than the threshold value, it is determined that no dots will be formed for the target pixel.

Here, it will be assumed that the recording rate (L) of large dots is "0", the recording rate (M) of medium dots is "40", the recording rate (S) of small dots is "122", and the threshold value is "75" (all values of the recording rates are converted into the range of 0 to 255). Under such assumption, since the recording rate (L) of the large dots is smaller than the threshold value in step (1), the flow proceeds to step (2) after determining that large dots should not be formed. In step (2), the sum (L+M) of the recording rate (L) of the large dots and the recording rate (M) of the medium dots is calculated as 40 (=0+40), which is smaller than the threshold value (=75), and thus the flow proceeds to step (3). In step (3), the sum (L+M+S) of the recording rate (L) of the large dots, the recording rate (M) of the medium dots, and the recording rate (S) of the small dots is calculated as 162 (=0+40+122), which is larger than the threshold value (=75), and it is thus determined that small dots should be formed. In this way, by sequentially summing the recording rates of each dot size and comparing the sum with the threshold value, the size of dots to be formed can be determined with only one threshold value.

When the halftone process on the target pixel is completed by the above-described processes, the computer 100 designates a pixel at the next position (step S318) and determines whether or not the processing has been completed for the entirety of pixels (step S320). If the processing has not been completed for the entirety of pixels, the computer 100 returns the processing flow to step S304 and repeats the above-described processes. On the other hand, when the processing has been completed for the entirety of pixels, it is determined whether or not the processing has been completed for the entire ink colors (step S322). If the processing has been completed for the entire ink colors, the halftone process ends, and otherwise, the processing flow returns to step S302, the processing of the next ink color is continued.

When the halftone process ends, the print data produced by the halftone process are transmitted to the printer 200. Upon receiving the print data, as described above, the printer 200 drives the print head 241 with these parameters: an overlap number of "2", a nozzle pitch of "2", and a sheet feeding amount of "15", thereby performing bidirectional printing where ink of each color is ejected for both the forward path and the return path of the print head 241.

According to the above-described printing process, the high-visibility ink is preferentially printed by the preceding nozzle group, and the low-visibility ink is evenly printed by the whole nozzles of a: nozzle array. Therefore, when seen from the same printing position on the printing medium, the high-visibility ink will be ejected earlier than the low-visibility ink. Therefore, when the ink ejection order is changed from an order of C, M, Y, and K to an order of K, Y, M, and C between the forward path and the backward path of bidirectional printing, the high-visibility ink will always be ejected relatively earlier than the low-visibility ink regardless of the changed ejection order. As a result, the drying of the high-visibility ink in which bleeding is easily noticeable is facilitated, thus suppressing the occurrence of non-uniform density caused by the low-visibility ink that is later printed at the same position.

Moreover, according to the present embodiment, the width of the preceding nozzle group is set to be identical to the width of a sheet feeding amount of the print head. Therefore, since the high-visibility ink can be ejected to a non-printed area on the printing medium, it is possible to suppress the occurrence of non-uniform density more effectively.

Furthermore, according to the present embodiment, it is possible to control the usage rate of each nozzle by only switching the dither mask to be used for the halftone process between the first dither mask D1 and the second dither mask D2. Therefore, it is possible to suppress the occurrence of non-uniform density at a low cost without adding any special circuits.

B. Second Embodiment

In the first embodiment, the drying of the high-visibility ink is facilitated by increasing the usage rate of the preceding nozzle group. In addition, a general dither mask is used for the low-visibility ink so that the whole nozzles of a nozzle array are equally utilized. In contrast, in the second embodiment, the usage rate of each nozzle is actively changed also for the low-visibility ink.

Figure 14:
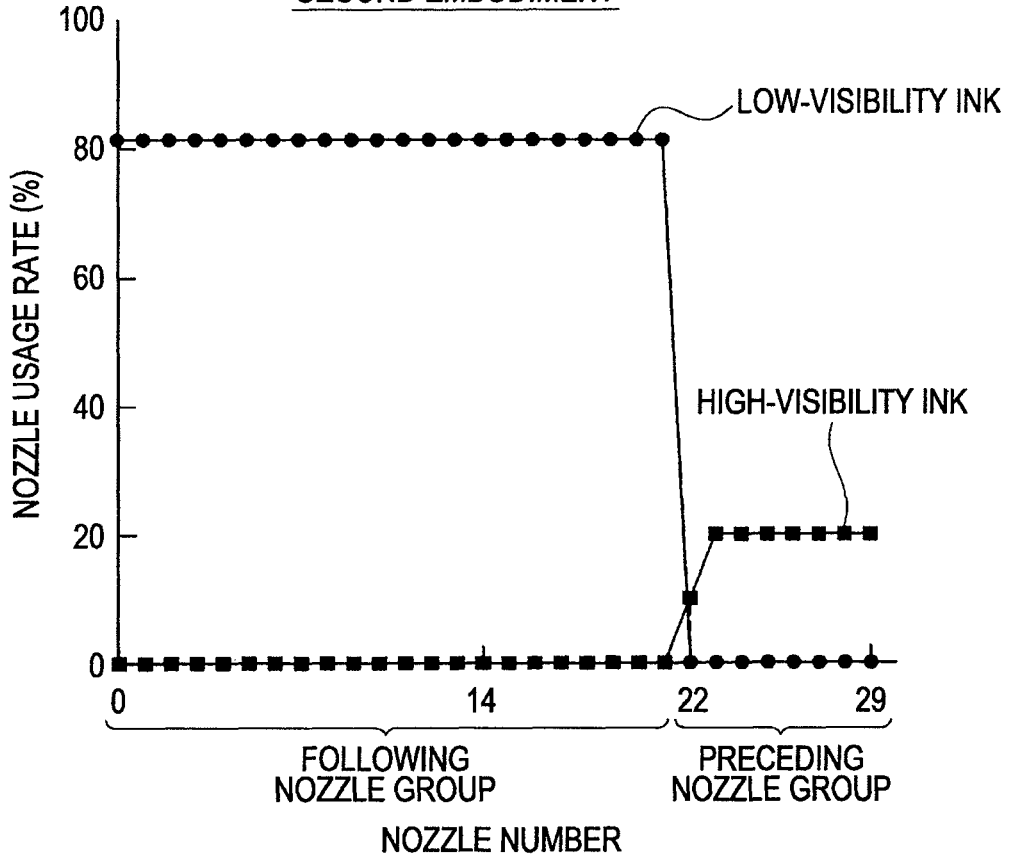
FIG. 14 is a graph illustrating the usage rate of each nozzle in the second embodiment.

FIG. 14 is a graph illustrating the usage rate of each nozzle in the second embodiment. As will be understood from FIG. 14, in the present embodiment, as for the high-visibility ink, the usage rate of the preceding nozzle group is increased similar to the first embodiment. In addition to this, in the present embodiment, as for the low-visibility ink, the nozzle usage rate of the preceding nozzle group is set to "0", and the nozzle usage rate of the following nozzle group (nozzle numbers 0 to 21) is increased, so that the ink is ejected with a target nozzle usage rate (60% in the case of FIG. 14) for the whole nozzle array.

Figure 15:
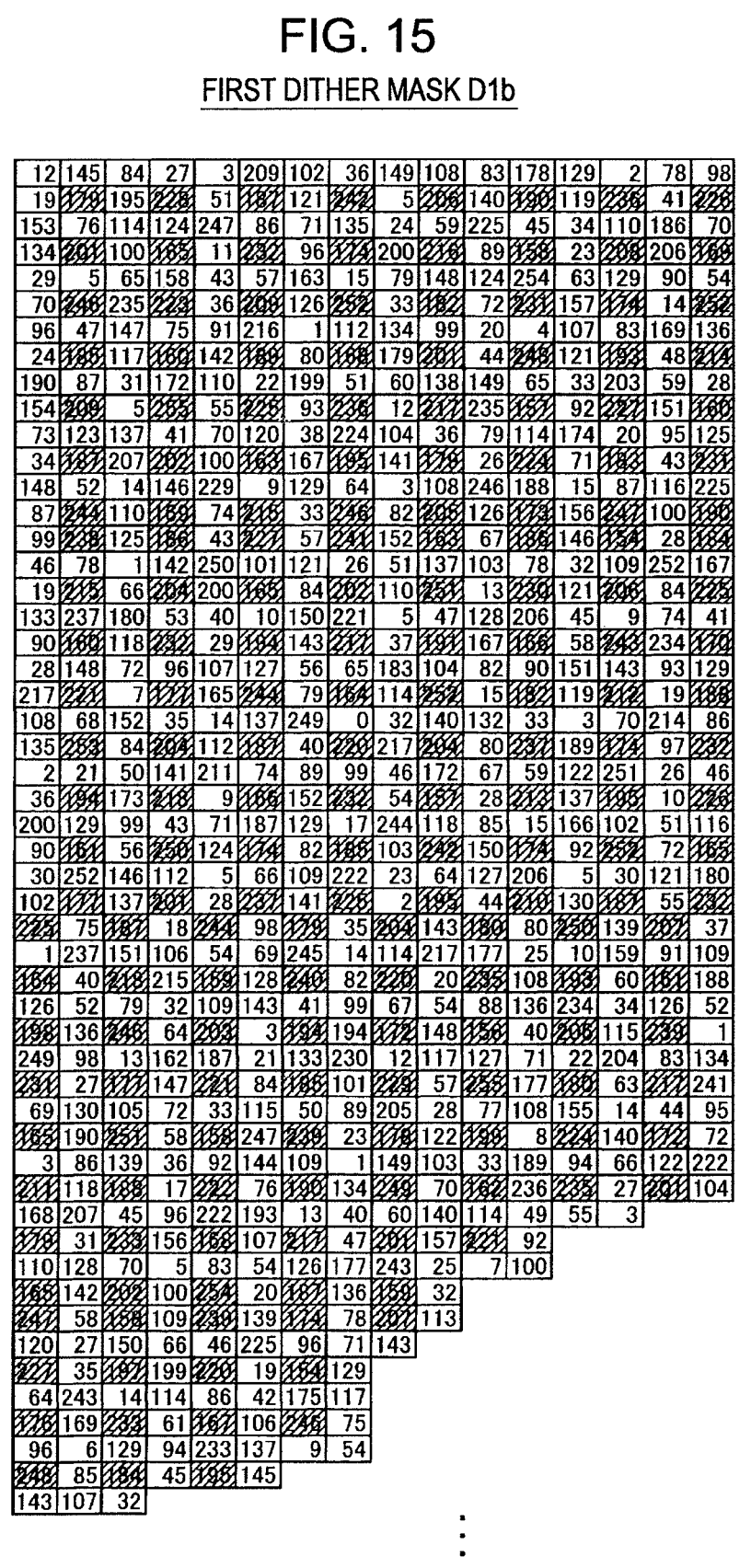

In the present embodiment, in order to increase the usage rate of the following nozzle group of a nozzle array ejecting the low-visibility ink, a dither mask is prepared in which lower threshold values are assigned to the hatched portions of the nozzle arrangement pattern illustrated in FIG. 7. In other words, in order to decrease the usage rate of the preceding nozzle group, a dither mask is prepared in which larger threshold values are assigned to the hatched portions. Such a dither mask will be referred to as a "first dither mask D1*b*". FIG. 15 illustrates part of the first dither mask D1*b*. The first dither mask D1*b* is a dither mask that is used in lieu of the first dither mask D1 in the halftone process routine illustrated in FIG. 12.

Figure 16:
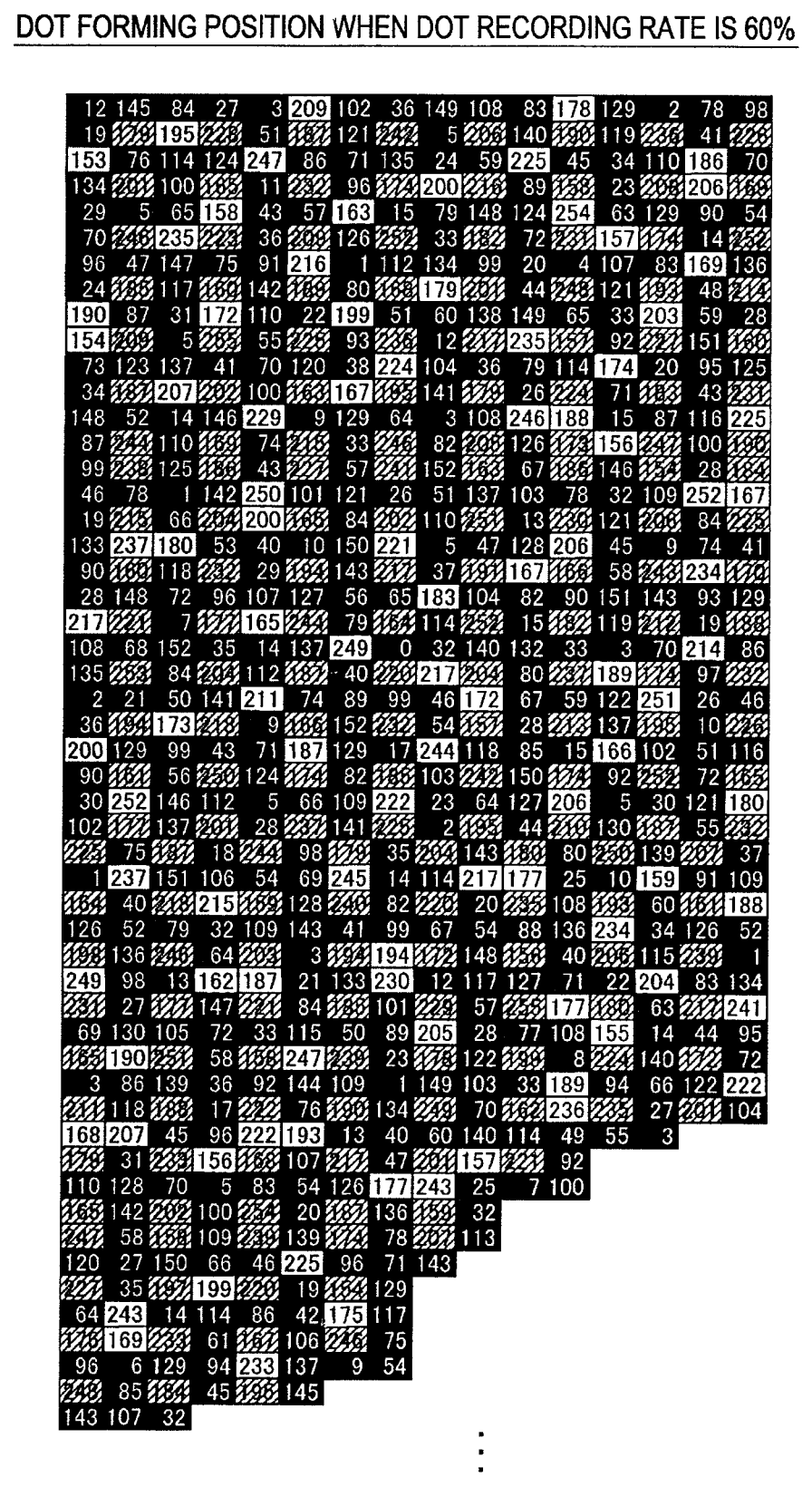

FIG. 16 is a schematic diagram illustrating the dot forming positions when a beta image having a dot recording rate of 60% was printed using the first dither mask D1*b*. As illustrated in FIG. 16, when the first dither mask D1*b* illustrated in FIG. 15 is used and the dot recording rate is at least 60%, the low-visibility ink is ejected only by the nozzles of the following nozzle group (nozzle numbers 0 to 21), which are not hatched.

As described above, in the present embodiment, by using the first dither mask D1*b* and the second dither mask D2, it is possible to perfectly separate the nozzles used for ejecting the high-visibility ink and the low-visibility ink into the preceding nozzle group and the following nozzle group, respectively. Therefore, it is possible to make sure that no low-visibility ink will be ejected when the high-visibility ink is being ejected, thus facilitating the drying of the high-visibility ink more effectively. As a result, the occurrence of non-uniform density on the printing medium can be suppressed more effectively.

C. Third Embodiment

In the first embodiment, the usage rate of the following nozzle group in a nozzle array ejecting a high-visibility ink is set to "0", whereas in the second embodiment, the usage rate of the preceding nozzle group in a nozzle array ejecting the low-visibility ink is set to "0". In contrast, in the third embodiment, the usage rate of each nozzle across the nozzle array is continuously changed in accordance with the nozzle number.

Figure 17:
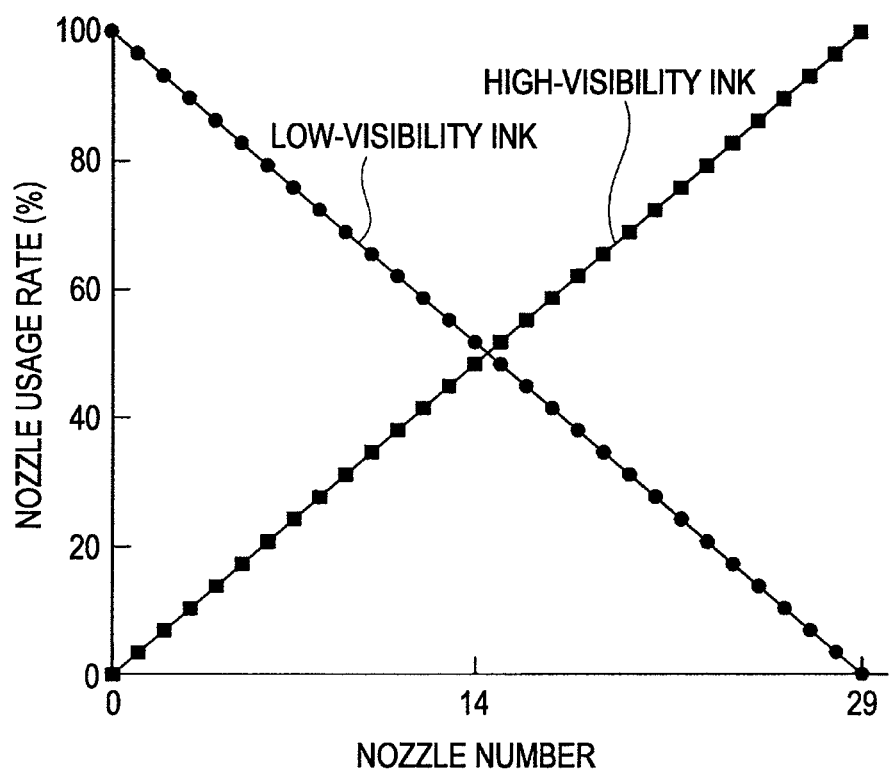
FIG. 17 is a graph illustrating the usage rate of each nozzle in the third embodiment.

FIG. 17 is a graph illustrating the usage rate of each nozzle in the third embodiment. As will be understood from FIG. 17, in the present embodiment, as for the high-visibility ink, the usage rate is increased as the nozzle number increases (as it gets closer to the forward-end nozzle), whereas as for the low-visibility ink, the usage rate is decreased as the nozzle number increases (as it gets closer to the forward-end nozzle). By doing so, the high-visibility ink can be ejected relatively earlier than the low-visibility ink.

Figure 19:
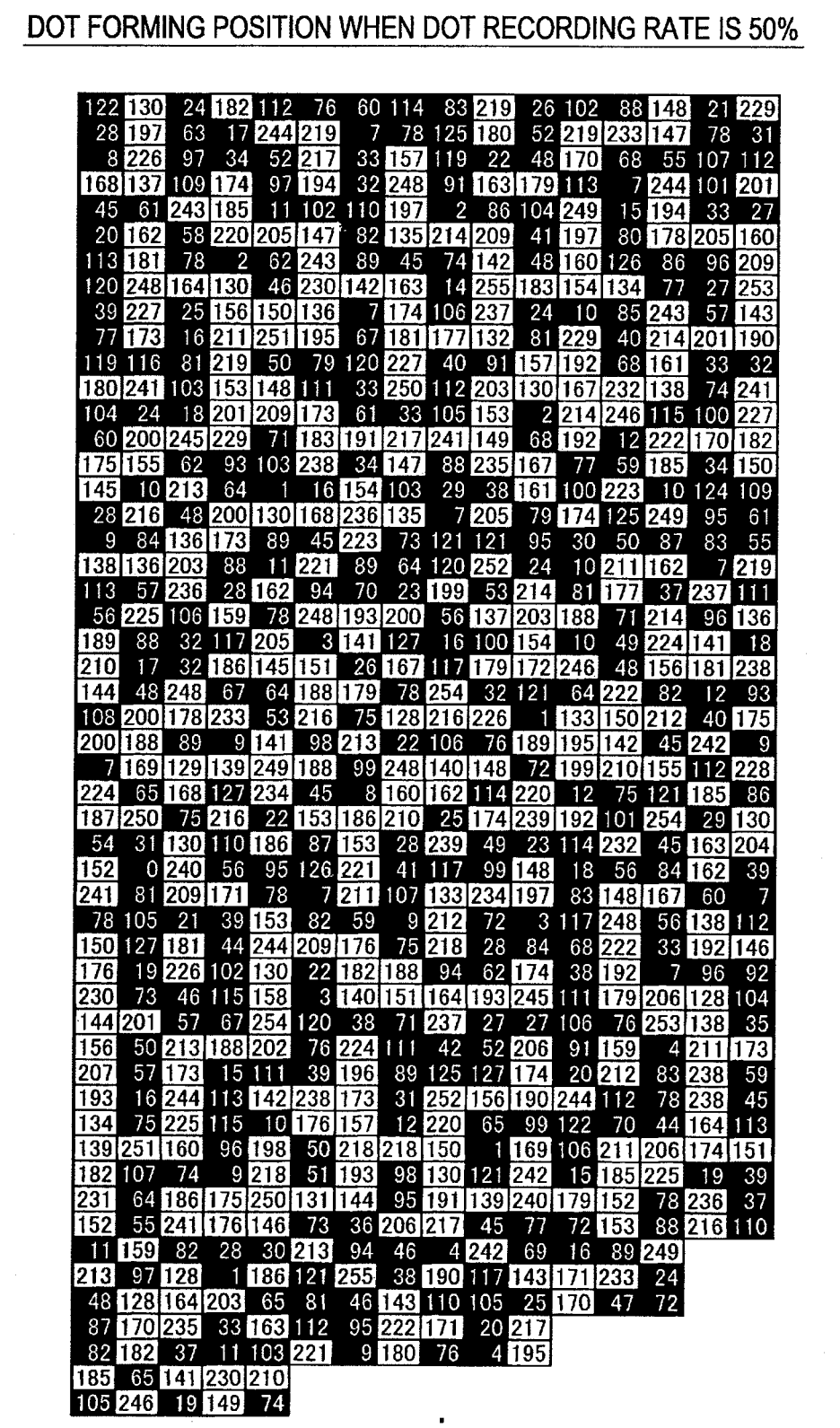

FIG. 18 is a schematic diagram illustrating part of a first dither mask D1c that realizes the usage rate of the low-visibility ink illustrated in FIG. 17. FIG. 19 is a schematic diagram illustrating the dot forming positions when a beta image having a dot recording rate of 50% was printed using the first dither mask D1c. FIGS. 20 to 23 illustrate how different groups of nozzles in the nozzle array form subsets of the dots illustrated in FIG. 19. Specifically, FIG. 20 illustrates the dots formed by the nozzle numbers 0 to 6, FIG. 21 illustrates the dots formed by the nozzle numbers 7 to 14, FIG. 22 illustrates the dots formed by the nozzle numbers 15 to 22, and FIG. 23 illustrates the dots formed by the nozzle numbers 23 to 29. As illustrated in the drawings, when the first dither mask D1c illustrated in FIG. 18 is used, the dot forming rate decreases as the nozzle number increases. That is to say, when the first dither mask D1c illustrated in FIG. 18 is used, it is possible to decrease the nozzle usage rate as the nozzle number increases.

Figure 25:
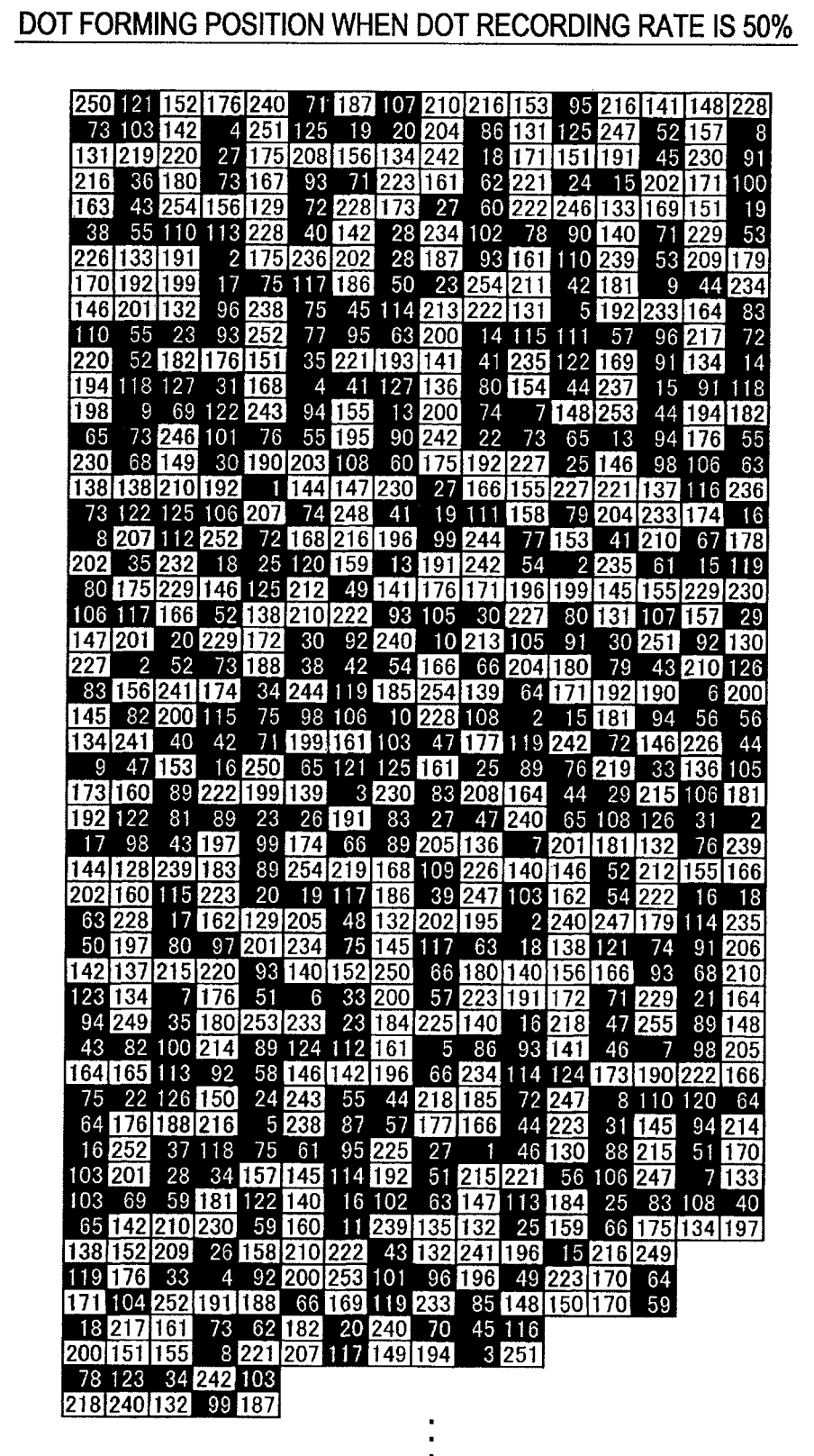

FIG. 24 is a schematic diagram illustrating part of a second dither mask D2c that realizes the usage rate of the high-visibility ink illustrated in FIG. 17. FIG. 25 is a schematic diagram illustrating the dot forming positions when a beta image having a dot recording rate of 50% was printed using the second dither mask D2c. FIGS. 26 to 29 illustrate how different groups of nozzles of the nozzle array form subsets of the dots illustrated in FIG. 25. Specifically, FIG. 26 illustrates the dots formed by the nozzle numbers 0 to 6, FIG. 27 illustrates the dots formed by the nozzle numbers 7 to 14, FIG. 28 illustrates the dots formed by the nozzle numbers 15 to 22, and FIG. 29 illustrates the dots formed by the nozzle numbers 23 to 29. As illustrated in the drawings, when the second dither mask D2c illustrated in FIG. 24 is used, the dot forming rate increases as the nozzle number increases. That is to say, when the second dither mask D2c illustrated in FIG. 24 is used, it is possible to increase the nozzle usage rate as the nozzle number increases.

D. Fourth Embodiment

In the first to third embodiments, the dither mask is changed in accordance with whether the ink being used is a high-visibility ink or a low-visibility ink. In contrast, in the fourth embodiment, the dither mask is changed in accordance with a dot recording rate. The printing system of the present embodiment has the same configuration as the first embodiment.

Figure 30:
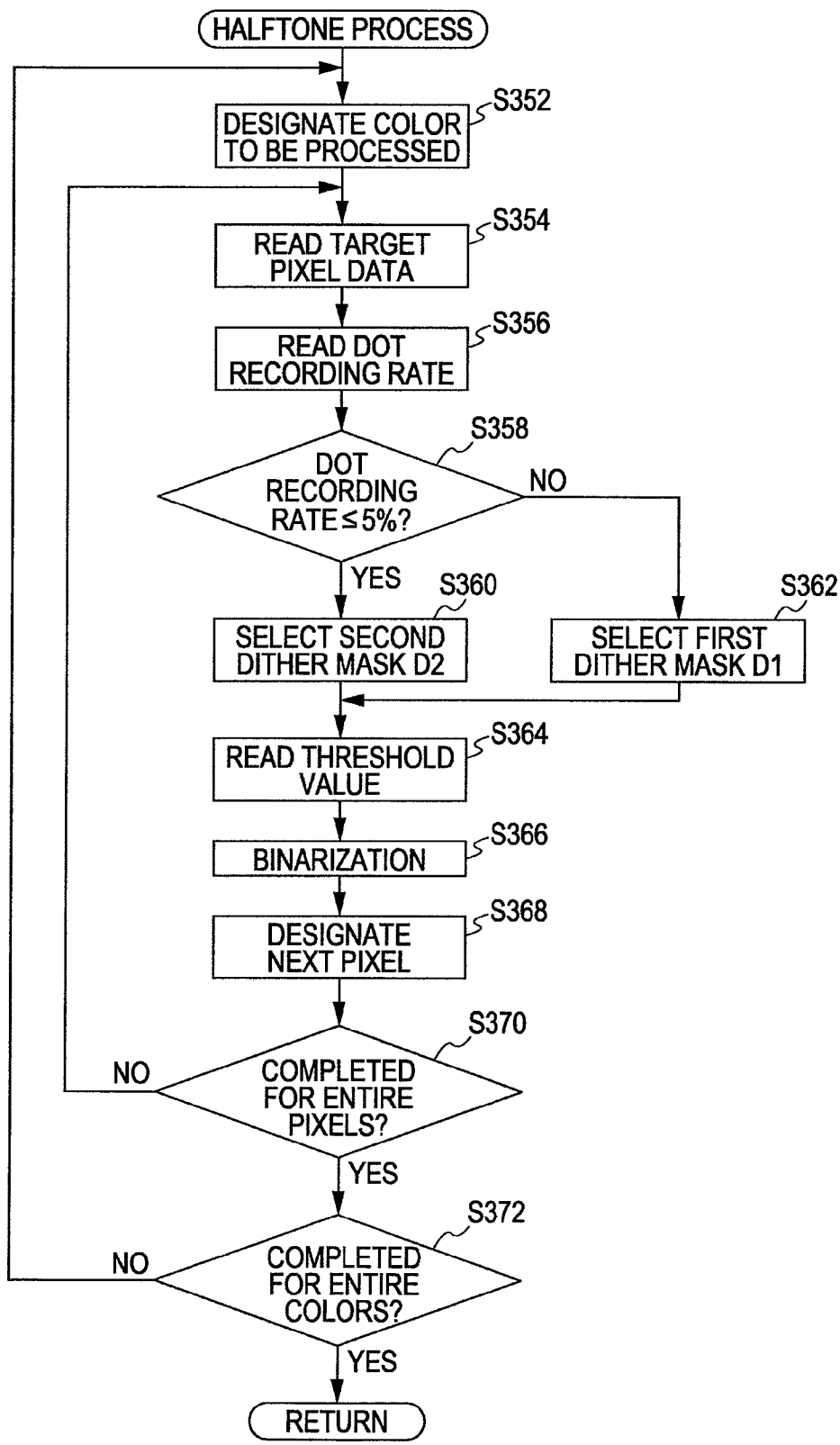
FIG. 30 is a flowchart illustrating a halftone process routine according to the fourth embodiment.

FIG. 30 is a flowchart illustrating a halftone process routine according to the fourth embodiment. In the halftone process routine of the present embodiment, first, the computer 100 designates one color to be processed from C, M, Y, and K (step S352) and then reads the gradation data of a target pixel (step S354).

Upon reading the gradation data of the target pixel, the computer 100 acquires a dot recording rate corresponding to the gradation data read in step S354 by referring to the dot recording rate table DT (see FIG. 13) (step S356). Upon acquiring the dot recording rate, the computer 100 determines whether or not the acquired dot recording rate is equal to or smaller than 5% (step S358). If the dot recording rate is equal to or smaller than 5%, the computer 100 selects the second dither mask D2 (step S360). On the other hand, if the acquired dot recording rate is larger than 5%, the computer 100 selects the first dither mask D1 (step S362). If a plurality of dot recording rates are acquired in step S356, a predetermined coefficient is multiplied to the dot recording rate of each size (S, M, or L), and an average of the multiplication results is calculated and used for the processing of step S358.

When the dither mask has been selected, the computer 100 reads a threshold value corresponding to the position of the target pixel from the dither mask (the first dither mask D1 or the second dither mask D2) selected in step S360 or S362 (step S364). Upon reading the threshold value, the computer 100 performs binarization (specifically, multi-thresholding) according to an organized dither method using the threshold value and the dot recording rate acquired in step S356 (step S366).

When the binarization on the target pixel is completed, the computer 100 designates a pixel at the next position (step S368) and determines whether or not the processing has been completed for the entirety of pixels (step S370). If the processing has not been completed for the entirety of pixels, the computer 100 returns the processing flow to step S354 and repeats the above-described processes. On the other hand, when the processing has been completed for the entirety of pixels, it is determined whether or not the processing has been completed for all the ink colors (step S352). If the processing has been completed for all the ink colors, the halftone process ends, and otherwise, the processing flow returns to step S352, the processing of the next ink color is continued.

In the above-described halftone process of the fourth embodiment, when the dot recording rate is low, the second dither mask D2 is selected regardless of the type of ink. Therefore, regardless of the ink color, low-density dots are formed by the preceding nozzle group earlier than high-density dots. As a result, even when high-visibility ink is printed sparsely, the high-visibility dots will be printed earlier than neighboring dots, whereby the occurrence of bleeding can be suppressed.

In the present embodiment, the second dither mask D2 is used for ink dots having lower dot recording rates, whereby printing is performed by the preceding nozzle group. In contrast, for example, dots having lower dot recording rates can be formed at the earliest embedding order (the 0-th embedding order in FIGS. 6A to 6C, for example) within a band. Specifically, in the flowchart of the halftone process illustrated in FIG. 30, when it is determined in step S358 that the dot recording rate is equal to or smaller than 5%, the computer 100 determines in step S360 that dots should be formed at the 0-th embedding order. On the other hand, if the dot recording rate is larger than 5%, it is determined in step S362 that dots should be formed at either one of the 1st to 3rd embedding orders. Then, the computer 100 produces the print data so that the embedding order determined by such processes is correlated with dots to be processed. The computer 100 transmits the produced print data to the printer 200 in step S400 of the printing process illustrated in FIG. 11. The printer 200 analyzes the received print data and forms dots on the printing medium in the designated embedding order. In this way, by changing the embedding order of forming dots in accordance with the dot recording rate, it is possible to make sure that the sparsely scattered dots are formed earlier without changing the dither mask to be used. The described process can be applied not only to the case of forming the sparsely scattered dots, but also to the case of forming dots corresponding to the high-visibility ink. Specifically, it is determined in step S358 whether or not a color being processed corresponds to a high-visibility ink, and if the color corresponds to the high-visibility ink, it is determined in step S360 that dots should be formed at the 0-th embedding order. By doing so, dots corresponding to the high-visibility ink can be formed at the earliest embedding order within a band.

In the halftone process illustrated in FIG. 30, the dither mask to be used is changed in accordance with the dot recording rate, whereby low-density dots are formed earlier than high-density dots. However, it is possible to make sure that low-density dots are formed earlier than high-density dots by using one dither mask.

Figure 31:
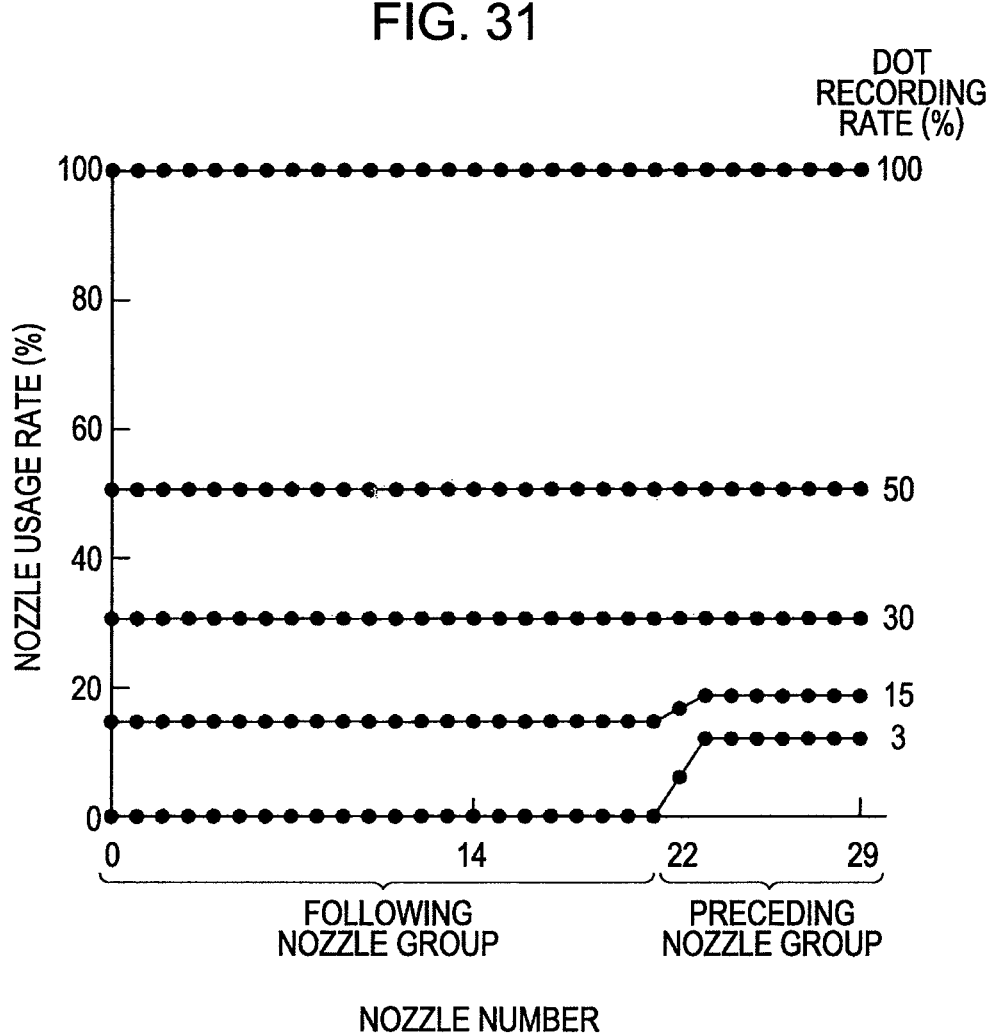
FIG. 31 is a graph illustrating the characteristics of a dither mask that enables low-density dots to be formed earlier than high-density dots, in accordance with many embodiments.

FIG. 31 is a graph illustrating the characteristics of a dither mask that enables the low-density dots to be formed earlier than the high-density dots. According to the dither mask having the characteristics illustrated in FIG. 31, as for the dot recording rates of 3% or smaller, the usage rate of the preceding nozzle group is increased whereas the usage rate of the following nozzle group is set to 0. When the dot recording rate is higher than 3%, the usage rate of the following nozzle group is gradually increased. When the dot recording rate exceeds 30%, the usage rates of all nozzles substantially have the same value. When the dither mask having such characteristics is used for all colors, the low-density dot can be formed earlier than the high-density dots by the preceding nozzle group without changing the dither mask being used. For example, when yellow dots of high density (for example, having a dot recording rate of 30% or more) and cyan dots of low density (for example, having a dot recording rate of 3% or smaller) are formed with the dither mask having the characteristics illustrated in FIG. 31, the high-density yellow dots will be formed evenly by all nozzles, whereas the low-density cyan dots will be preferentially formed by the preceding nozzle group. Therefore, the cyan dots will be formed with a substantially full dot density in a state where other dots such as yellow dots constitute only a portion of the full dot density, whereby the bleeding of cyan dots can be suppressed.

Figure 32:
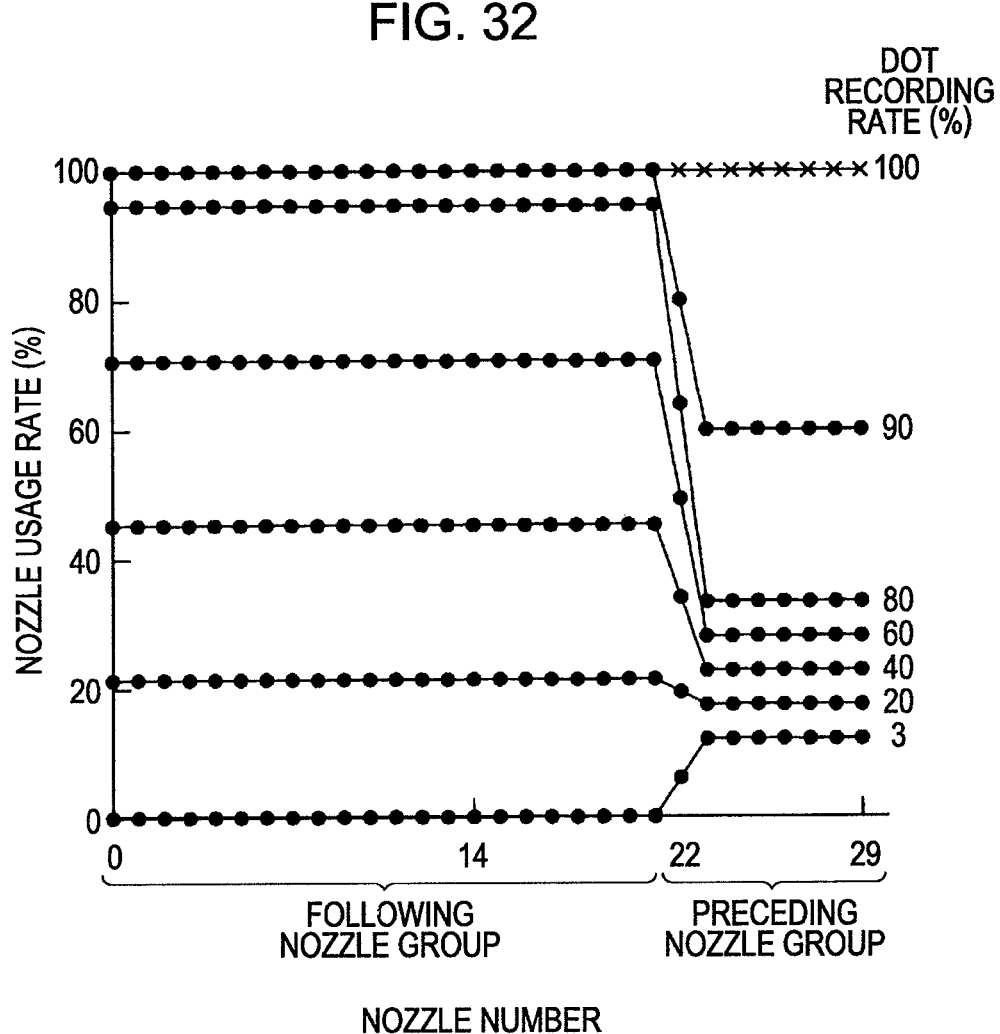
FIG. 32 is a graph illustrating the characteristics of another dither mask that enables low-density dots to be formed earlier than high-density dots, in accordance with many embodiments.

FIG. 32 is a graph illustrating the characteristics of another dither mask that enables low-density dots to be formed earlier than high-density dots. According to the dither mask having the characteristics illustrated in FIG. 32, as for dot recording rates of 3% or smaller, the usage rate of the preceding nozzle group is increased whereas the usage rate of the following nozzle group is set to 0. When the dot recording rate is higher than 3%, the usage rate of the following nozzle group is gradually increased. When the dot recording rate exceeds 20%, the usage rate of the following nozzle group is increased so to be higher than the usage rate of the preceding nozzle group. When the dither mask having such characteristics is used for all colors, the low-density dot can be formed earlier than the high-density dots by the preceding nozzle group without changing the dither mask being used. Moreover, the high-density dots can be preferentially formed by the following nozzle group. Therefore, when the high-density yellow dots and low-density cyan dots are printed, the bleeding of cyan dots can be suppressed more effectively.

E. Modifications

Although various embodiments of the invention have been described, the invention is not limited to the above embodiments and can be implemented in a variety of ways without departing from the scope or spirit of the invention. For example, the following modifications are possible.

E-1. Modification 1

In the above-described embodiments, the nozzle usage rate is controlled by using a special dither mask so that the usage rate of the preceding nozzle group or the following nozzle group is increased. However, such a control can be performed by an error diffusion method. A method of controlling the nozzle usage rate according to the error diffusion method will be described below.

First, the procedure of a halftone process according to a general error diffusion method will be described. When the gradation data of each pixel have values of 0 to 255, in the general error diffusion method, the halftone process is performed by the following procedure.

(1) Errors diffused from processed pixels are added to the gradation data of a target pixel.

(2) The gradation data after the error-addition are compared with a predetermined threshold value (for example, a fixed value of 127) to be binarized to either one of 0 (dot OFF) or 255 (dot ON).

(3) Errors between the binarized values (0 or 255) and the gradation data after the error-addition are calculated.

(4) The calculated errors are diffused to the neighboring non-processed pixels by a predetermined diffusion ratio (for example, to four neighboring pixels by a ratio of ¼).

(5) The processing target is changed to the next pixel.

For example, the halftone process on the low-visibility ink in the first embodiment can be performed in that procedure. In contrast, as for the halftone process on the high-visibility ink in the first embodiment, step (2) is modified as follows. Specifically, when the dot recording rate of the target pixel is equal to or smaller than 5% (i.e., the target pixel has gradation data of 13), and the target pixel corresponds to nozzle numbers of 0 to 22, the gradation data are forcibly set to 0 (dot OFF), and if the described conditions are not satisfied, the process of step (2) is performed. By modifying step (2) in such a manner, similar to the first embodiment, it is possible with the error diffusion method to increase the usage rate of the preceding nozzle group (nozzle numbers 23 to 29) among nozzles of the nozzle array ejecting the high-visibility ink while maintaining the usage rate of the following nozzle group (nozzle numbers 0 to 22) substantially at 0.

Moreover, as for the halftone process on the low-visibility ink in the second embodiment, step (2) is modified as follows. Specifically, when the dot recording rate of the target pixel is equal to or smaller than 60% (i.e., the target pixel has gradation data of 153), and the target pixel corresponds to nozzle numbers of 23 to 29, the gradation data are forcibly set to 0 (dot OFF), and if the described conditions are not satisfied, the process of step (2) is performed. By modifying step (2) in such a manner, similar to the second embodiment, it is possible with the error diffusion method to increase the usage rate of the following nozzle group (nozzle numbers 0 to 22) among nozzles of the nozzle array ejecting the low-visibility ink while maintaining the usage rate of the preceding nozzle group (nozzle numbers 23 to 29) at substantially 0.

Furthermore, the threshold value used in step (2) may be changed in order to continuously change the usage rate of each nozzle in accordance with the nozzle number similar to the third embodiment. For example, when the threshold value increases as the nozzle number increases, the probability of dots being formed for that pixel will decrease. Conversely, when the threshold value decreases as the nozzle number decreases, the probability of dots being formed for that pixel will increase. In this manner, when the threshold value is linearly changed in accordance with the nozzle number by using a predetermined function, similar to the third embodiment, it is possible to continuously change the usage rate of each nozzle in accordance with the nozzle number. When the function used for determining the threshold value is a function capable of outputting a polygonal curve or a smooth curve, it is possible to approach closer to a target nozzle usage rate. Moreover, the function being used changes not only with the nozzle number but also with the gradation data (dot recording rate), it is possible to control the nozzle usage rate in accordance with the gradation data.

E-2. Modification 2

In the above-described embodiments, printing is performed by the printing system 10 which is configured by the computer 100 and the printer 200. In contrast, the printer 200 can receive image data directly from a digital camera or various memory cards and perform printing. That is to say, a CPU in the control circuit 260 of the printer 200 can execute the same processes as the above-described printing process and halftone process, whereby printing is performed.

E-3. Modification 3

In the above-described embodiments, ink is classified into high-visibility ink or low-visibility ink, and various controls are performed so as to suppress bleeding of the high-visibility ink. In contrast, the above-described embodiments can be applied so as to suppress bleeding of ink that mixes well with another ink due to the properties that it has such as surface tension or penetrability to a printing medium. That is to say, when ink that mixes well with another ink is treated as a "high-visibility ink" in the above-described embodiments, it is possible to suppress bleeding of the ink having well-mixing properties

What is claimed is:

1. A printing apparatus that performs printing on a printing medium by causing relative movement between a print head and the printing medium, the apparatus comprising:
    a print head comprising a plurality of nozzles configured to eject ink, the plurality of nozzles comprising preceding nozzles and following nozzles, the preceding nozzles preceding the following nozzles during movement of the print head relative to the printing medium;
    an acquisition unit that acquires image data; and
    a dot forming unit that controls the print head so as to eject the ink to form dots corresponding to the image data on the printing medium, wherein:
    when suppression dots, which are dots formed to suppress bleeding, are formed on the printing medium, the dot forming unit controls the print head so that the preceding nozzles eject the ink onto the printing medium earlier than the following nozzles;
    wherein the ink comprises a first ink and a second ink, and wherein the plurality of nozzles further comprises:
        a first nozzle array arranged in a sub-scanning direction and configured to eject the first ink, and
        a second nozzle array arranged in the sub-scanning direction and configured to eject the second ink,
    wherein the suppression dots are formed from the second ink, wherein the second ink has a higher propensity for producing visible bleeding than the first ink,
    each of the first and second nozzle arrays being arranged in a main scanning direction and comprising a plurality of the preceding nozzles and a plurality of the following nozzles, the main scanning direction being generally transverse to the sub-scanning direction;
    wherein the second nozzle array is configured such that the preceding nozzles of the second nozzle array arrive on the printing medium prior to the following nozzles of the second array during movement of the print head relative to printing medium in the sub-scanning direction; and
    the dot forming unit ejects the second ink with a usage rate of the preceding nozzles of the second array higher than a usage rate of the preceding nozzles of the first nozzle array that are arranged at positions corresponding to the preceding nozzles of the second array.

2. The printing apparatus according to claim 1, wherein:
    the dot forming unit determines the dot forming position of the first ink by comparing threshold values of a first dither mask having a first plurality of threshold values with first pixel data constituting a first image; and
    the dot forming unit determines the dot forming position of the second ink by comparing threshold values of a second dither mask having a second plurality of threshold values with second pixel data constituting a second image.

3. The printing apparatus according to claim 2, wherein a number of elements in the main scanning direction and in the sub-scanning direction of the second dither mask are respectively integral multiples of corresponding numbers of elements of a nozzle arrangement pattern that occurs repeatedly on the printing medium when the print head performs a main scan and a sub-scan, respectively, so that dots are formed on the printing medium by the second nozzle array.

4. The printing apparatus according to claim 2, wherein the second dither mask is configured such that the second threshold values are selected such that a usage rate of the preceding nozzles of the second array exceeds a usage rate of the following nozzles of the second array.

5. The printing apparatus according to claim 2, wherein a number of elements in the main scanning direction and in the sub-scanning direction of the first dither mask are respectively integral multiples of corresponding numbers of elements of a nozzle arrangement pattern that occurs repeatedly on the printing medium when the print head performs a main scan and a sub-scan, respectively, so that dots are formed on the printing medium by the first nozzle array.

6. The printing apparatus according to claim 2, wherein the first dither mask is configured such that the first threshold values are selected such that a usage rate of the following nozzles of the first array exceeds a usage rate of the preceding nozzles of the first array.

7. The printing apparatus according to claim 1, wherein at least one of a number of nozzles of the preceding nozzles of the first array or a number of nozzles of the preceding nozzles of the second array corresponds to an amount of one subscan.

8. The printing apparatus according to claim 1, further comprising a dot recording rate conversion unit that converts the acquired image data into a dot recording rate representing density of dots per unit area of the printing medium, wherein the suppression dots are dots having the converted dot recording rate lower than a predetermined value.

9. The printing apparatus according to claim 1, wherein:
    the dot forming unit starts embedding dots within a band corresponding to a width of the print head in a sub-scanning direction by causing the print head to perform several main scans while changing a dot forming position for each main scan; and
    the preceding nozzles comprise nozzles among the plurality of nozzles that form dots within the band during a first main scan of the several main scans.

10. The printing apparatus according to claim 1, wherein when the suppression dots are formed on the printing medium, the dot forming unit further controls the print head so that a usage rate of the preceding nozzles forming the suppression dots is higher than a usage rate of the following nozzles forming the suppression dots.

11. The printing apparatus according to claim 10, wherein the usage rate of the following nozzles for the suppression dots is zero.

12. The printing apparatus according to claim 10, wherein the usage rate of the following nozzles is gradually decreased.

13. A printing method that performs printing on a printing medium by causing relative movement between a print head and the printing medium, the print head comprising a plurality of nozzles configured to eject ink, the plurality of nozzles comprising preceding nozzles and following nozzles, the preceding nozzles preceding the following nozzles during movement of the print head relative to the printing medium, the method comprising:

acquiring image data; and controlling the print head so as to eject the ink, thereby forming dots corresponding to the image data on the printing medium, wherein:

when suppression dots, which are dots formed to suppress bleeding, are formed on the printing medium, the dot forming step controls the print head so that the preceding nozzles eject the ink onto the printing medium earlier than the following nozzles;

wherein the ink comprises a first ink and a second ink, and wherein the plurality of nozzles further comprises:

a first nozzle array arranged in a sub-scanning direction and configured to eject the first ink, and a second nozzle array arranged in the sub-scanning direction and configured to eject the second ink, wherein the suppression dots are formed from the second ink, wherein the second ink has a higher propensity for producing visible bleeding than the first ink, each of the first and second nozzle arrays being arranged in a main scanning direction and comprising a plurality of the preceding nozzles and a plurality of the following nozzles, the main scanning direction being generally transverse to the sub-scanning direction;

wherein the second nozzle array is configured such that the preceding nozzles of the second nozzle array arrive on the printing medium prior to the following nozzles of the second array during movement of the print head relative to printing medium in the sub-scanning direction; and controlling the print head comprises ejecting the second ink with a usage rate of the preceding nozzles of the second array higher than a usage rate of the preceding nozzles of the first nozzle array that are arranged at positions corresponding to the preceding nozzles of the second array.

14. The printing method according to claim 13, wherein when the suppression dots are formed on the printing medium, controlling the print head further comprises controlling the print head so that a usage rate of the preceding nozzles forming the suppression dots is higher than a usage rate of the following nozzles forming the suppression dots.

15. The printing method according to claim 14, wherein the usage rate of the following nozzles for the suppression dots is zero.

16. The printing method according to claim 14, wherein the usage rate of the following nozzles is gradually decreased.

17. A non-transitory computer-readable medium, storing thereon a computer program product for controlling a printing apparatus that performs printing on a printing medium by causing relative movement between a print head and the printing medium, the print head comprising a plurality of nozzles configured to eject ink, the plurality of nozzles comprising preceding nozzles and following nozzles, the preceding nozzles preceding the following nozzles during movement of the print head relative to the printing medium, the computer program allowing a computer to implement a method comprising:

acquiring image data; and controlling the print head so as to eject the ink, thereby forming dots corresponding to the image data on the printing medium, wherein:

when suppression dots, which are dots formed to suppress bleeding, are formed on the printing medium, the dot forming function controls the print head so that the preceding nozzles eject the ink onto the printing medium earlier than the following nozzles;

wherein the ink comprises a first ink and a second ink, and wherein the plurality of nozzles further comprises:

a first nozzle array arranged in a sub-scanning direction and configured to eject the first ink, and a second nozzle array arranged in the sub-scanning direction and configured to eject the second ink, wherein the suppression dots are formed from the second ink, wherein the second ink has a higher propensity for producing visible bleeding than the first ink, each of the first and second nozzle arrays being arranged in a main scanning direction and comprising a plurality of the preceding nozzles and a plurality of the following nozzles, the main scanning direction being generally transverse to the sub-scanning direction;

wherein the second nozzle array is configured such that the preceding nozzles of the second nozzle array arrive on the printing medium prior to the following nozzles of the second array during movement of the print head relative to printing medium in the sub-scanning direction; and controlling the print head comprises ejecting the second ink with a usage rate of the preceding nozzles of the second array higher than a usage rate of the preceding nozzles of the first nozzle array that are arranged at positions corresponding to the preceding nozzles of the second array.

18. The computer-readable medium according to claim 17, wherein when the suppression dots are formed on the printing medium, controlling the print head further comprises controlling the print head so that a usage rate of the preceding nozzles forming the suppression dots is higher than a usage rate of the following nozzles forming the suppression dots.

19. The computer-readable medium according to claim 18, wherein the usage rate of the following nozzles for the suppression dots is zero.

20. The computer-readable medium according to claim 18, wherein the usage rate of the following nozzles is gradually decreased.

* * * * *